United States Patent
Irons et al.

(10) Patent No.: US 10,621,239 B2
(45) Date of Patent: Apr. 14, 2020

(54) MANAGING PRINTED DOCUMENTS IN A DOCUMENT PROCESSING SYSTEM

(71) Applicant: DocSolid LLC, Phoenix, AZ (US)

(72) Inventors: Steven W. Irons, Phoenix, AZ (US);
David R. Guilbault, Scottsdale, AZ (US); Eric R. Lynn, Phoenix, AZ (US);
Dale Shoup, Goodyear, AZ (US);
Anthony Argenziano, Phoenix, AZ (US); Simon Okunev, Milburn, NJ (US); Ian M. Miller, Summit, NJ (US)

(73) Assignee: DocSolid LLC, Phoenix, AZ (US)

( * ) Notice: Subject to any disclaimer, the term of this patent is extended or adjusted under 35 U.S.C. 154(b) by 0 days.

(21) Appl. No.: 16/043,128

(22) Filed: Jul. 23, 2018

(65) Prior Publication Data

US 2018/0329903 A1 Nov. 15, 2018

Related U.S. Application Data

(63) Continuation-in-part of application No. 15/605,902, filed on May 25, 2017, now Pat. No. 10,264,159, which is a continuation-in-part of application No. 14/733,223, filed on Jun. 8, 2015, now Pat. No. 10,110,771.

(51) Int. Cl.
*G06F 16/93* (2019.01)
*G06F 3/12* (2006.01)
*H04N 1/32* (2006.01)

(52) U.S. Cl.
CPC ............ *G06F 16/93* (2019.01); *G06F 3/1204* (2013.01); *G06F 3/1242* (2013.01); *G06F 3/1254* (2013.01); *G06F 3/1259* (2013.01); *G06F 3/1282* (2013.01); *G06F 3/1285* (2013.01); *H04N 1/32144* (2013.01); *H04N 2201/3246* (2013.01)

(58) Field of Classification Search
None
See application file for complete search history.

(56) References Cited

U.S. PATENT DOCUMENTS

| 6,192,165 B1 | 2/2001 | Irons et al. |
| 6,427,032 B1 | 6/2002 | Irons et al. |
| 6,674,924 B2 | 1/2004 | Wright et al. |
| 6,744,936 B2 | 6/2004 | Irons et al. |

(Continued)

*Primary Examiner* — Nicholas Pachol
(74) *Attorney, Agent, or Firm* — Martin & Associates, LLC; Derek P. Martin

(57) ABSTRACT

A printed document manager manages printed documents and is separate from Document Management Systems (DMSs) that manage electronic soft copy documents. One or more DMSs are registered with a postmark server. A client computing device executes a postmark client, detects a print event for a specified document, and queries a postmark server to determine whether the print event for the specified document should include a graphical postmark. In response, the postmark server queries one or more of the registered DMSs to determine whether the specified document matches a document in any of the repositories of the registered DMS(s). When the specified document to be printed matches a document in a registered DMS, the postmark server authorizes the postmark client to add the graphical postmark in a print stream corresponding to the print event for the specified document.

23 Claims, 31 Drawing Sheets

(56) References Cited

U.S. PATENT DOCUMENTS

| | | |
|---|---|---|
| 6,952,281 B1 | 10/2005 | Irons et al. |
| 7,182,259 B2 | 2/2007 | Lubow et al. |
| 7,606,831 B2 | 10/2009 | Quinn et al. |
| 7,733,522 B2 | 6/2010 | Irons et al. |
| 7,798,417 B2 | 9/2010 | Snyder et al. |
| 7,942,328 B2 | 5/2011 | Snyder et al. |
| 8,194,272 B2 | 6/2012 | Yoshizumi et al. |
| 8,194,274 B2 | 6/2012 | Babbrah et al. |
| 8,375,324 B1 | 2/2013 | Zubizarreta et al. |
| 8,787,616 B2 | 6/2014 | Irons et al. |
| 9,025,213 B1 | 5/2015 | Irons et al. |
| 9,323,784 B2 | 4/2016 | King et al. |
| 9,355,263 B2 | 5/2016 | Irons et al. |
| 9,378,205 B1 | 6/2016 | Schmidt |
| 10,129,172 B1* | 11/2018 | Stafford .................. H04L 67/34 |
| 2001/0039625 A1 | 11/2001 | Ananda |
| 2002/0059145 A1* | 5/2002 | Leon .................. G07B 17/0008 705/60 |
| 2002/0091545 A1* | 7/2002 | Heiden .............. G07B 17/0008 705/401 |
| 2002/0111960 A1 | 8/2002 | Irons et al. |
| 2003/0115162 A1 | 6/2003 | Konick |
| 2004/0064422 A1* | 4/2004 | Leon ........................ B07C 3/18 705/401 |
| 2004/0083189 A1* | 4/2004 | Leon ................ G07B 17/00024 705/401 |
| 2004/0196491 A1* | 10/2004 | Uchino ................. G06F 21/608 358/1.15 |
| 2005/0065892 A1* | 3/2005 | Ryan, Jr. ............... H04L 9/3247 705/62 |
| 2006/0184522 A1 | 8/2006 | McFarland et al. |
| 2008/0163364 A1 | 7/2008 | Ferlitsch |
| 2008/0239328 A1 | 10/2008 | Mariotti et al. |
| 2009/0037444 A1 | 2/2009 | Stapleton |
| 2009/0070348 A1 | 3/2009 | Uejo |
| 2009/0327409 A1* | 12/2009 | Mayer .................... G06Q 10/08 709/203 |
| 2010/0033754 A1 | 2/2010 | Okita |
| 2010/0067041 A1* | 3/2010 | Endruscheit ...... G07B 17/00508 358/1.15 |
| 2010/0097661 A1 | 4/2010 | Hoblit |
| 2010/0237993 A1* | 9/2010 | Ohsawa ............. H04N 1/32101 340/5.86 |
| 2011/0001989 A1 | 1/2011 | Pesar |
| 2011/0007336 A1* | 1/2011 | Taniguchi .......... H04N 1/32133 358/1.14 |
| 2011/0032547 A1 | 2/2011 | Saito |
| 2011/0293135 A1* | 12/2011 | Irons .................... H04N 1/2166 382/101 |
| 2014/0019843 A1 | 1/2014 | Schmidt |
| 2014/0159874 A1 | 6/2014 | Hull et al. |
| 2014/0258334 A1* | 9/2014 | Mukasa ............... G06F 21/6218 707/781 |
| 2015/0186654 A1 | 7/2015 | Albrecht |
| 2015/0235034 A1 | 8/2015 | Irons et al. |
| 2018/0005336 A1* | 1/2018 | Nolan .................... G06Q 10/10 |

* cited by examiner

Postmark Registry 510

| ID | DMSVolumeID | Checksum | FilePath | Filename | FileExtension | Modified Date | Deleted Flag | Created Date |
|---|---|---|---|---|---|---|---|---|
| 1 | 1 | <value1> | /Data/Docs | 16.2 | DOC | 2017-01-21 | False | 2016-12-22 |
| 2 | 1 | <value2> | /Data/Docs | 20.1 | XLS | 2017-03-16 | False | 2017-03-16 |
| 3 | 1 | <value3> | /Data/Docs | 21.2 | PDF | 2016-09-14 | False | 2014-07-02 |
| ... | ... | ... | ... | ... | ... | ... | ... | ... |
| N | | | | | | | | |

FIG. 5

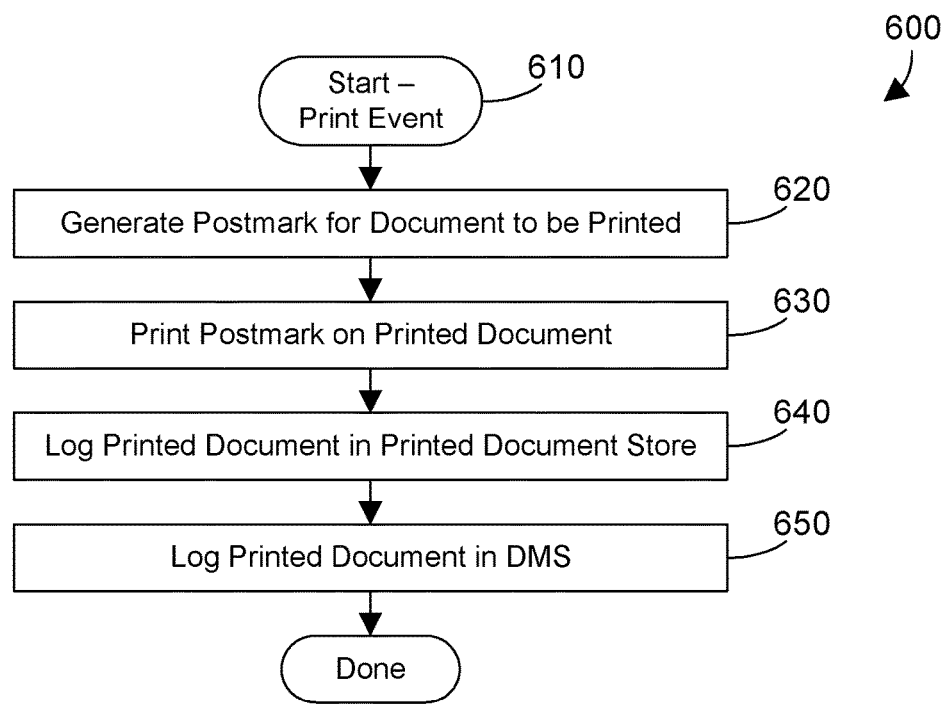
FIG. 6
| Print Event Identifier | | |
|---|---|---|
| FirmID | ClientID | Date/Time in Milliseconds |
| AEL | <clientID1> | <encoded value2> |
FIG. 7
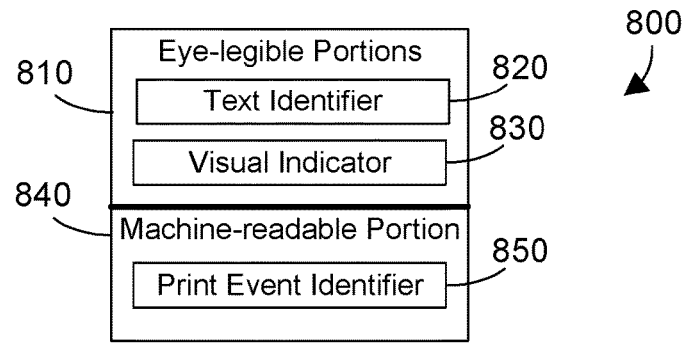
FIG. 8

MANAGING PRINTED DOCUMENTS IN A DOCUMENT PROCESSING SYSTEM

BACKGROUND

1. Technical Field

This disclosure generally relates to processing of documents, and more specifically relates to managing printed documents in a document processing system.

2. Background Art

Computer systems have vastly improved the efficiency of many modern workers by providing ways to quickly and efficiently generate and handle electronic documents. Many software tools have been developed that generate and/or process electronic documents in various ways, including word processors, spreadsheets, databases, scanning software, web page development systems, content management systems, hypertext markup language (HTML), extensible markup language (XML), etc. It has long been the goal of many people in the information processing field to realize a "paperless office", which means an office where physical paper documents are completely replaced with electronic documents. However, the dream of achieving a paperless office has not been achieved in most business contexts.

One major problem to achieving a paperless office is the preference of many people to work with hard printed copies of documents. Even with a document management system and procedures in place that convert all incoming paper documents to electronic form, people often will print hard copies to take to meetings, to take hand-written notes on, because they prefer to read from paper, or because they prefer to file in paper form. There is currently no known way to effectively identify, track, manage or confidently shred documents that have been printed from a document management system.

BRIEF SUMMARY

A printed document manager manages printed documents and is separate from Document Management Systems (DMSs) that manage electronic soft copy documents. One or more DMSs are registered with a postmark server. A client computing device executes a postmark client, detects a print event for a specified document, and queries a postmark server to determine whether the print event for the specified document should include a graphical postmark. In response, the postmark server queries one or more of the registered DMSs to determine whether the specified document matches a document in any of the repositories of the registered DMS(s). When the specified document to be printed matches a document in a registered DMS, the postmark server authorizes the postmark client to add the graphical postmark in a print stream corresponding to the print event for the specified document. When the specified document to be printed does not match any document in any registered DMS, the postmark server instructs the postmark client not to add the graphical postmark in the print stream corresponding to the print event for the specified document.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 5 is a table showing one suitable example of entries in the Postmark Registry;

FIG. 6 is a flow diagram of a method performed by the printed document manager;

FIG. 7 is a table showing data that could be included in a postmark;

FIG. 8 is a block diagram that shows components of a postmark;

DETAILED DESCRIPTION

The claims and disclosure herein provide a printed document manager that manages printed documents and is separate from Document Management Systems (DMSs) that manage electronic soft copy documents. One or more DMSs are registered with a postmark server. A client computing device executes a postmark client, detects a print event for a specified document, and queries a postmark server to determine whether the print event for the specified document should include a graphical postmark. In response, the postmark server queries one or more of the registered DMSs to determine whether the specified document matches a document in any of the repositories of the registered DMS(s). When the specified document to be printed matches a document in a registered DMS, the postmark server authorizes the postmark client to add the graphical postmark in a print stream corresponding to the print event for the specified document. When the specified document to be printed does not match any document in any registered DMS, the postmark server instructs the postmark client not to add the graphical postmark in the print stream corresponding to the print event for the specified document.

Figure 1:
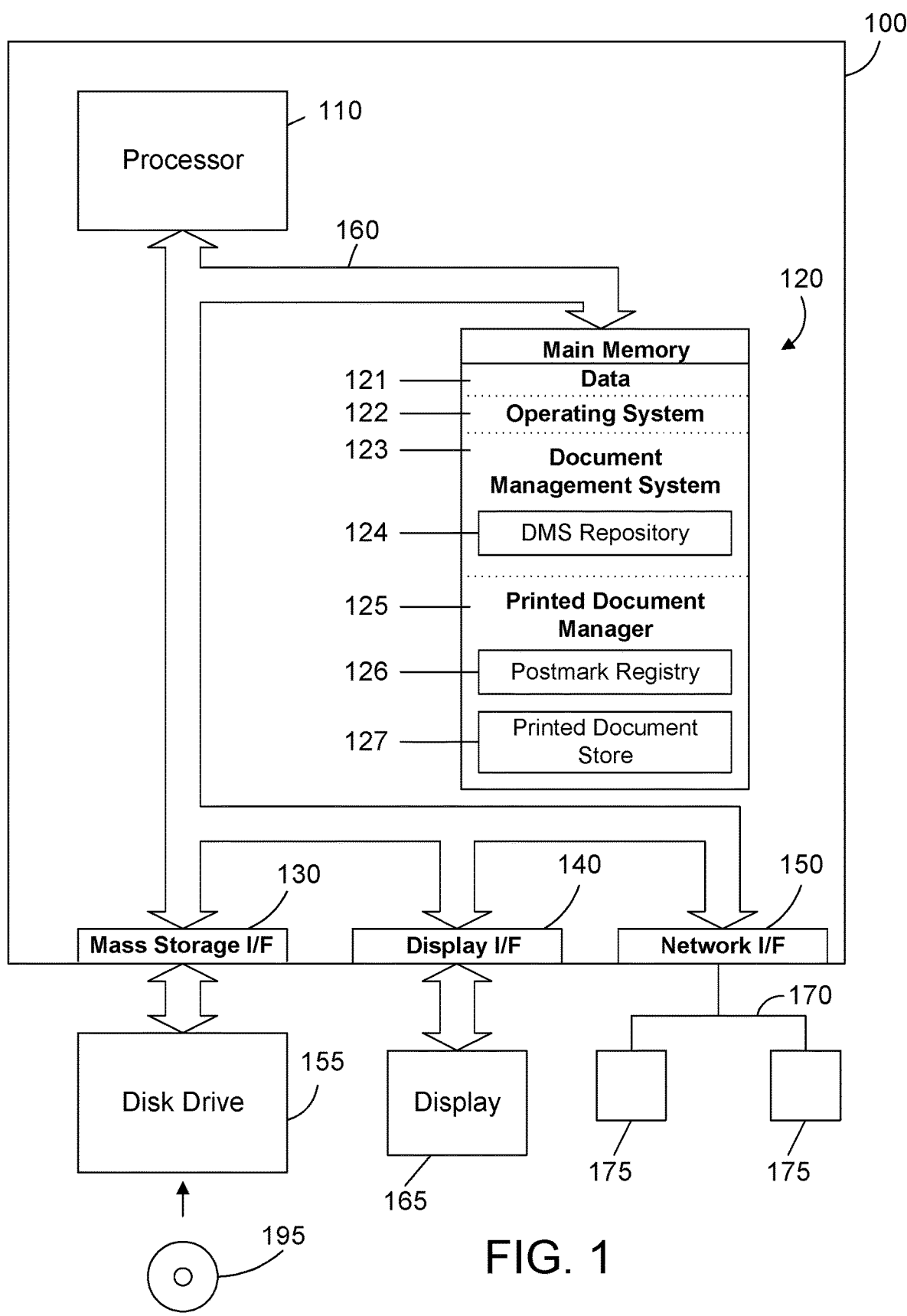
FIG. 1 is a block diagram of a computer system that includes a printed document manager that manages printed documents.

Referring to FIG. 1, computer system 100 is one suitable implementation of a computer system that could implement the printed document manager disclosed and claimed herein. Computer system 100 could be any suitable computer system, such as a MICROSOFT WINDOWS computer system. WINDOWS is a registered trademark of Microsoft Corporation. Those skilled in the art will appreciate that the disclosure herein applies equally to any computer system, regardless of whether the computer system is a complicated multi-user computing apparatus, a single user workstation, an embedded control system, or a mobile device such as a smart phone, tablet computer, laptop computer, etc. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a disk drive 155, to computer system 100. One specific type of disk drive 155 is a readable and writable CD-RW drive, which may store data to and read data from a CD-RW 195. CD-RW 195 is one suitable example of non-transitory computer readable media.

Main memory 120 preferably contains data 121, an operating system 122, a document management system 123, and a printed document manager 124. The document management system manages documents in a DMS repository 124. The printed document manager 125 could be part of the document management system 123, or could be separate from the document management system 123. A document processing system could include both the document management system 123 and the printed document manager 125. The printed document manager 125 registers documents in the DMS repository 124 in a postmark registry 126. The printed document manager 125 also generates postmarks for printed documents and stores those printed documents in a printed document store 127. Details regarding possible functions of the printed document manager 125 are given below.

Computer system 100 can utilize well known virtual addressing mechanisms that allow the programs of computer system 100 to behave as if they only have access to a large, single storage entity instead of access to multiple, smaller storage entities such as main memory 120 and disk drive 155. Therefore, while data 121, operating system 122, document management system 123 and printed document manager 125 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100. In addition, computer system 100 could include one or more virtual machines, with a document processing system that includes the document management system 123 and the printed document manager 125 running on one or more virtual machines.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that a printed document manager as disclosed and claimed herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems or other network devices 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within network interface 150.

As will be appreciated by one skilled in the art, aspects of the disclosed printed document manager may be embodied as a system, method or computer program product. Accordingly, aspects of the printed document manager may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the document processing system may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the document processing system may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the printed document manager are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the prior art, there is no known way to manage the connection between the printed documents and its source, namely the soft copy document. Hard copy documents may be managed by scanning the documents into an electronic form that is then managed by a document management system. In addition, management of native soft copies of documents (such as word processor files, spreadsheets, etc.) is easily done by a document management system. However, once a hard copy is printed, there are no known ways to manage the printed documents and their relationship to their soft copy counterpart. One known attempt to manage this relationship is to print a footer on all word processing documents that shows the filename and storage location of the document. But this does not work for documents that are not word processing documents. In addition, while such a footer on a word processing document is eye-legible, it does not include any machine-readable information that allows the functions disclosed herein. The disclosure and claims herein improve on the prior art by providing a printed document manager that manages printed documents.

Figure 2:
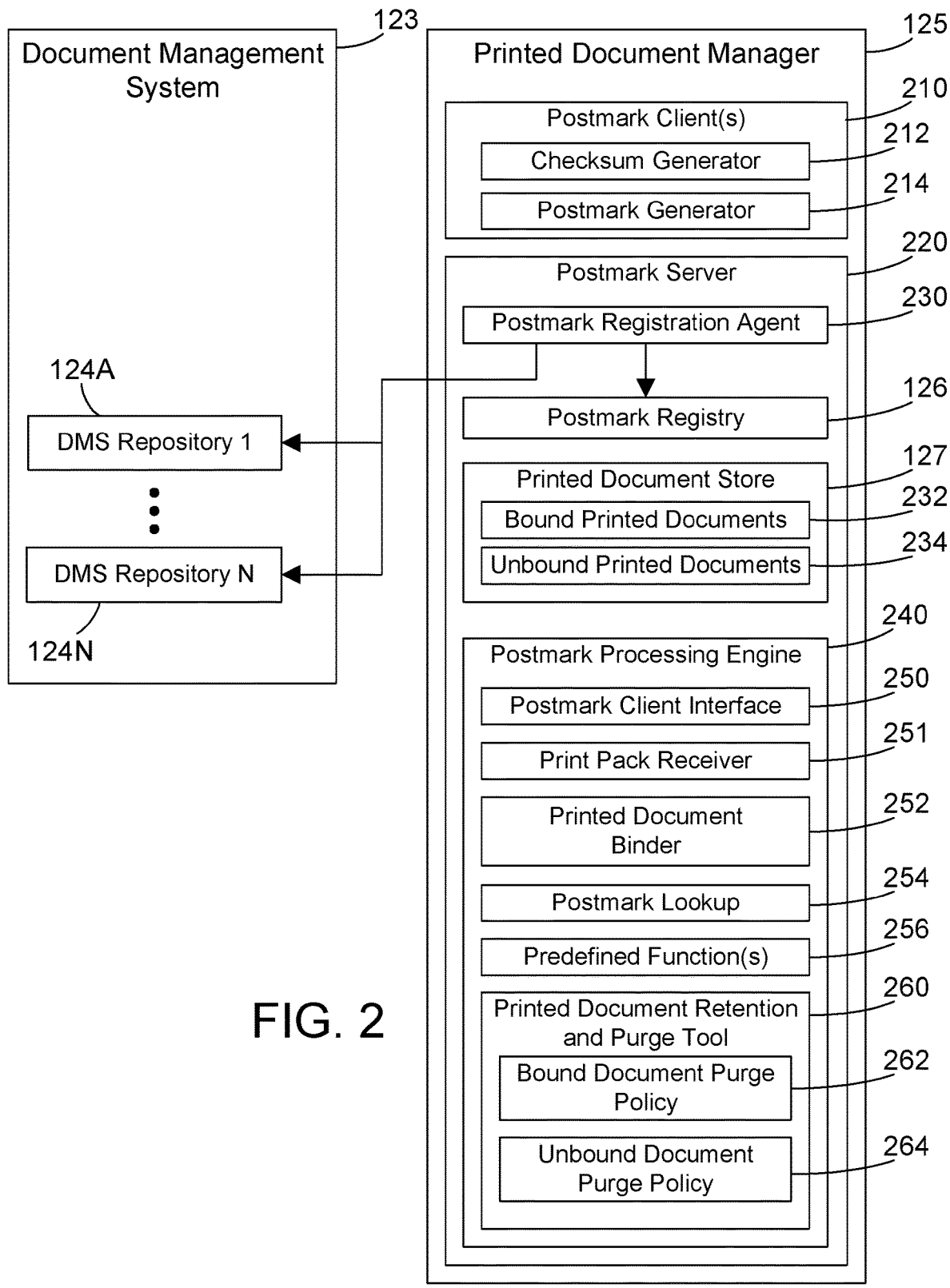
FIG. 2 is a block diagram showing possible components of the printed document manager shown in FIG. 1 and how the printed document manager interacts with a repository in a document management system.

Some possible components of an embodiment of the printed document manager 125 in FIG. 1 are shown in FIG. 2. In the most preferred implementation, the printed document manager 125 is separate from the document management system 123. This allows the printed document manager 125 to be used with any suitable document management system. The document management system 123 manages documents in one or more DMS repositories 124, shown in FIG. 2 as DMS repository 1 124A, . . . , DMS repository N 124N. DMS repositories 124A, . . . , 124N are suitable examples of the DMS repository 124 shown in FIG. 1. The printed document manager 125 may include one or more postmark clients 210, and a postmark server 220. Each postmark client 210 preferably includes a checksum generator 212 and a postmark generator 214. The checksum generator 212 takes a checksum of the document to be printed, and passes the checksum to the postmark server 220 to determine whether or not the postmark client should generate a postmark for the printed document. The checksum generator 212 is most preferably a feature built into the operating system in each workstation running a postmark client, such as a Windows checksum function. In the alternative, the checksum generator 212 could be code provided with each postmark client 210. The postmark generator 214 generates a graphical postmark, and the postmark client 210 inserts the graphical postmark into the print stream for the document when authorized by the postmark server to print a postmark. This allows the printed document manager to print postmarks on documents it manages, as explained in detail below.

The postmark server 220 preferably includes a postmark registration agent 230, a postmark registry 126, a printed document store 127, and a postmark processing engine 240. The postmark registration agent 230 monitors the DMS repositories 124A, . . . , 124N, each representing one or more folders or directories where documents, including new documents, are stored in the document management system 123. When a new document is detected in the DMS repository 124, the postmark registration agent 230 generates a checksum for the document, and creates an entry in the postmark registry 126 that includes the checksum, which effectively registers the document to be managed by the printed document manager 125. The postmark registry 126 is a database that lists all documents in the DMS repository 124 that have been registered so the printed document manager 125 can manage the corresponding printed documents.

The printed document store 127 is a database of printed documents, and typically includes bound printed documents 232 and unbound printed documents 234. A printed document is bound when the printed document corresponds to a document in a DMS repository that has an entry in the postmark registry 126. A printed document is unbound when the printed document does not correspond to any document in a DMS repository that has an entry in the postmark registry 126. In one implementation, the postmark server 220 receives what is referred to herein as a "print pack" for a printed document that includes a metadata/image pair, where the metadata includes one or more attributes that describe the printed document, and the image is an image of the printed document. The print pack is processed, and corresponding data in the print pack is stored in the printed document store 127. Each postmark client 210, after processing a print job that includes a postmark, generates a corresponding print pack and stores the printed documents in the printed document store 127 by sending the corresponding print pack to the postmark server 220, which then receives the print pack, unpacks the print pack, and stores the information in the print pack in the printed document store 127. Once the postmark client 210 receives confirmation from the postmark server that the print pack has been received, the postmark client 210 may delete its local copy of the print pack.

The postmark processing engine 240 provides many of the functions of the postmark server 220. The postmark processing engine 240 preferably includes a postmark client interface 250, a print pack receiver 251, a printed document binder 252, a postmark lookup 254, one or more predefined functions 256, and a printed document retention and purge tool 260. The postmark client interface 250 is an interface to the postmark client(s) 210 and allows communicating between the postmark client(s) 210 and the postmark processing engine 240. The postmark processing engine preferably tracks all of the postmark clients it serves. The print pack receiver 251 is software that provides an interface for the postmark client(s) 210 to send their print packs and confirm their reception. Print pack receiver 251, in response to receiving a print pack, unpacks the print pack to file the printed documents in the printed document store 127. The printed document binding process 252 is software that attempts to bind any unbound printed documents 234 in the printed document store 127 to a corresponding entry in the postmark registry 126. When the printed document binding process 252 sees an entry in the postmark registry 126 that corresponds to one of the unbound printed documents 234, the printed document binding process 252 binds the printed documents to the entry in the postmark registry 126, which converts the unbound printed document to a bound printed document.

The postmark lookup 254 is most preferably software that runs in conjunction with a suitable optical reader, such as a barcode reader, to lookup the postmark data from the machine-readable portion of the graphical postmark symbol via the optical reader. One or more predefined functions 256 may include user-defined functions that can be performed automatically as a result of scanning a postmark. The predefined functions 256 are discussed in detail below with reference to FIGS. 12-15.

Figure 23:
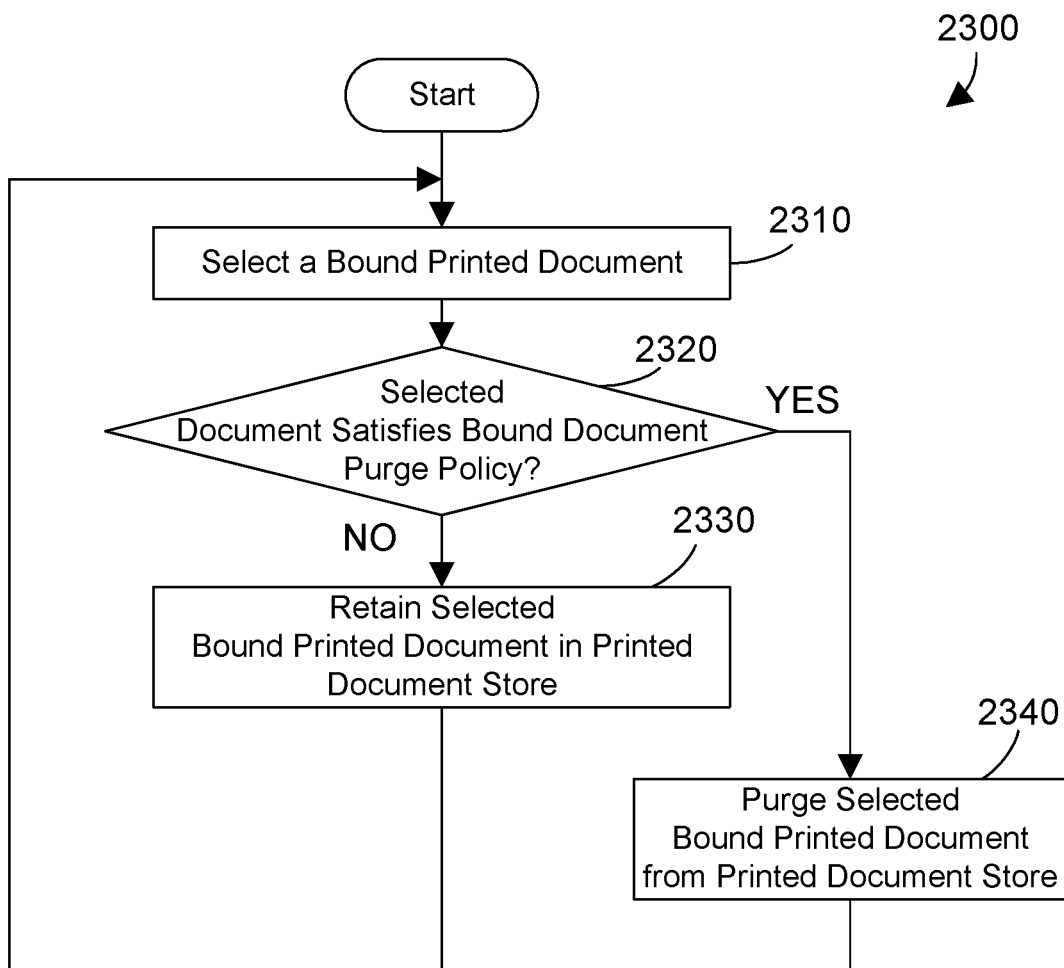
FIG. 23 is a flow diagram of a method preferably performed by the printed document retention and purge tool in FIG. 2 for determining whether to retain or purge a bound document in the printed document store.
Figure 24:
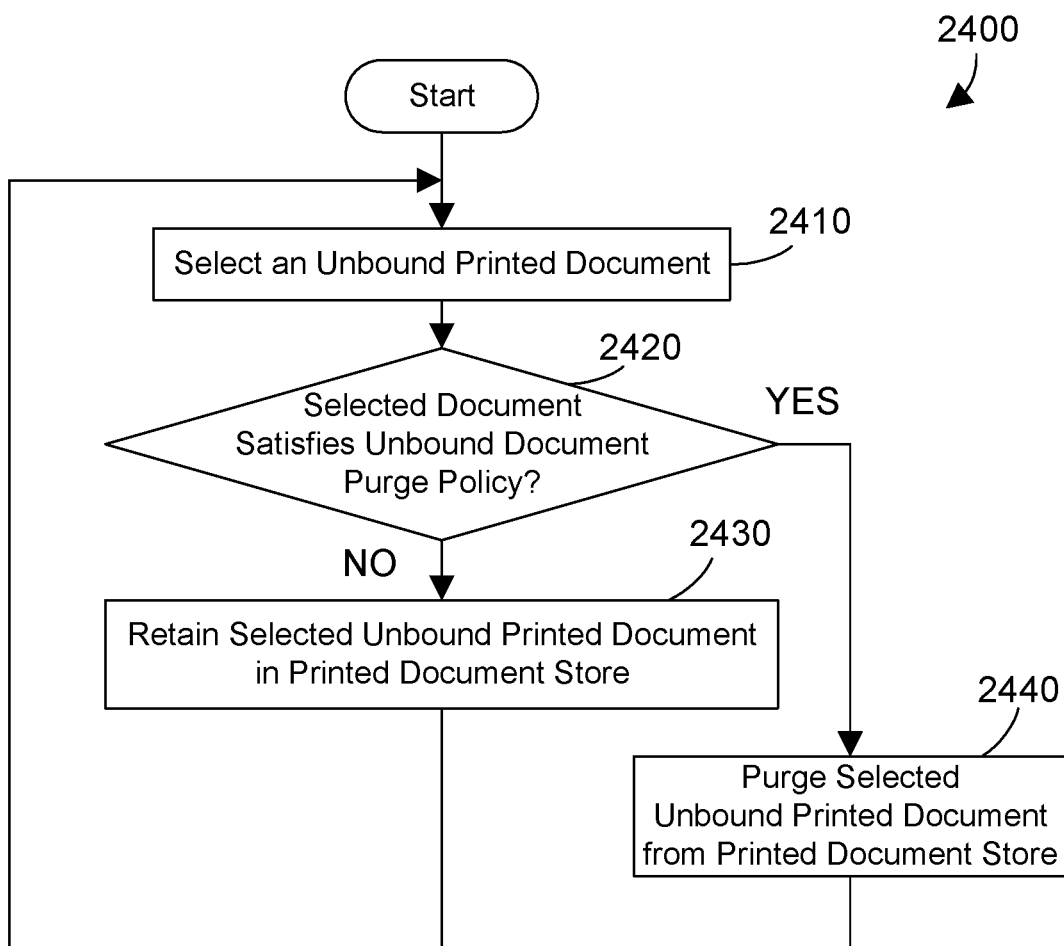
FIG. 24 is a flow diagram of a method preferably performed by the printed document retention and purge tool in FIG. 2 for determining whether to retain or purge an unbound document in the printed document store.

The printed document retention and purge tool 260 is software that monitors both the bound printed documents 232 and the unbound printed documents 234 in the printed document store 127. The printed document retention and purge tool 260 preferably functions according to a bound document purge policy 262 and an unbound document purge policy 264. In the most preferred implementation, the purge policies for bound and unbound documents are different, as represented by the two separate policies 262 and 264 in FIG. 2, and as discussed below with reference to FIGS. 23 and 24. Of course, the printed document retention and purge tool 260 could use a single purge policy for both bound and unbound documents. Note that a purge policy specifies criteria that, when satisfied, causes a document to be purged. In the alternative, retention policies could be specified that, when satisfied, causes a document to be retained. One skilled in the art will recognize the printed document retention and purge tool 260 could function according to one or more defined retention policies, or one or more defined purge policies.

While the various components of an embodiment of the printed document manager 125 are shown in FIG. 2, these can be distributed across any suitable number of computer systems in any suitable architecture or configuration, as needed. The disclosure and claims herein extend to any suitable configuration for a printed document manager that includes any or all of the components shown in FIG. 2 on one or more computer systems.

The printed document manager 125 shown in FIGS. 1 and 2 can have multiple modes of operation. In a first mode of operation, documents in a DMS are pre-registered in the postmark registry, and when the postmark server needs to determine whether or not to authorize a postmark for a document, the postmark server queries the postmark registry to see if the document being printed is in the postmark registry. The first mode of operation is discussed below with reference to FIGS. 3-29. In a second mode of operation, no documents are pre-registered in the postmark registry. Instead, one or more DMSs are registered in the postmark registry, and when the postmark server needs to determine whether or not to authorize a postmark for a document, the postmark server queries one or more of the registered DMSs to see if the document being printed is in a registered DMS. The second mode of operation is discussed below with reference to FIGS. 30-38.

Figure 3:
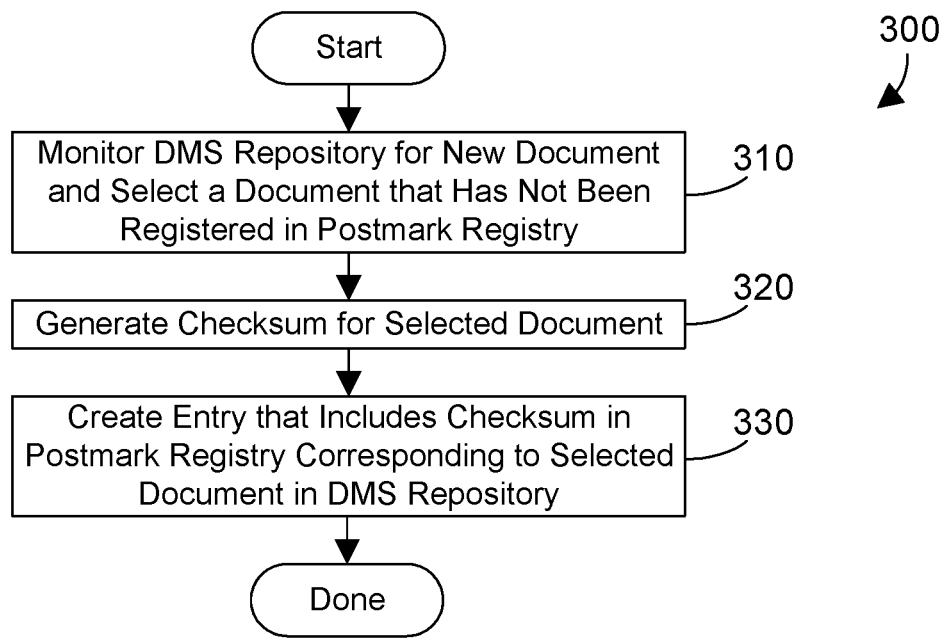
FIG. 3 is a flow diagram of a method for registering documents in the DMS repository in the postmark registry.

Referring to FIG. 3, a method 300 is preferably performed by the postmark registration agent 230 in FIG. 2, and represents one suitable way to register documents to be managed by the printed document manager 125. The postmark registration agent 230 monitors one or more DMS repositories for new documents that have not been registered in the postmark registry, and selects one of those documents (step 310). The DMS repository could be, for example, a folder or directory where groups of users share documents as part of their job function. In the most preferred implementation, the DMS repository could be a folder or directory where new native soft copy documents are stored after they are created to be managed by the document management system (such as one of the DMS repositories 124 in FIGS. 1 and 124A, . . . , 124N in FIG. 2). A checksum is generated for the selected document (step 320). The checksum is preferably generated in step 320 using an operating system utility on the user's workstation that is running the postmark client. While the term "workstation" is used herein to refer to a computer system running the postmark client, this term may include any suitable computer or electronic device, including without limitation desktop computers, laptop computers, tablet computers, smart phones, etc., which are all examples of a client computing device. An entry for the document is created in the postmark registry that corresponds to the selected document in the DMS repository (step 330). Method 300 is then done. By performing method 300, the postmark registration agent registers a document to be managed by the printed document manager 125. Method 300 is well-suited to processing a repository that may include many documents that have not been registered with the printed document manager. This would be the case, for example, when the printed document manager is installed for use in conjunction with an existing document management system (DMS). In this case, all the documents in the DMS repository 124 managed by the DMS 123 could be gradually and systematically processed using method 300 in FIG. 3 to effectively register those documents to be managed by the printed document manager 125. Method 300 is also well-suited for monitoring a repository for the addition of new soft copy documents to keep the postmark registry 126 up to date.

Figure 4:
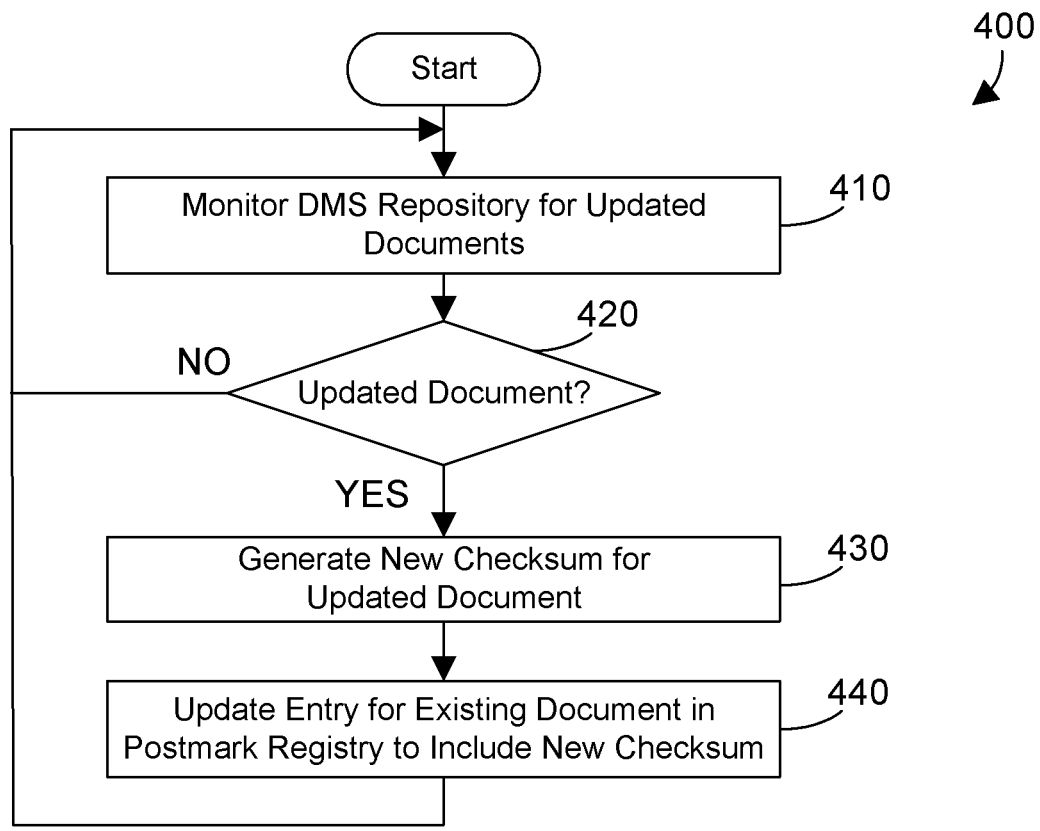
FIG. 4 is a flow diagram of a method for registering newly added documents to a DMS repository in the postmark registry.

Referring to FIG. 4, a method 400 is preferably performed by the postmark registration agent 230 in FIG. 2, and represents another suitable way to register documents to be managed by the printed document manager 125. In the implementation shown in FIG. 4, a DMS repository is monitored for updated documents (step 410). The DMS repository 124 could be, for example, a folder or directory where groups of users share documents as part of their job function. In the most preferred implementation, the DMS repository 124 could be a folder or directory where new native soft copy documents are maintained after they are created to be managed by the document management system (such as DMS 123 in FIGS. 1 and 2). When there are no updated documents (step 420=NO), method 400 loops back to step 410 and continues. When there is an updated document in the DMS repository (step 420=YES), a new checksum is generated for the updated document (step 430), and the existing entry in the postmark registry is updated to include the new checksum (step 440). Method 400 is then done. In the most preferred implementation, method 400 runs continuously to detect when documents are updated in the DMS repository and to maintain the entries for those documents in the postmark registry.

While not explicitly shown in FIGS. 3 and 4, the postmark registration agent 230 will also detect when a document is deleted from a DMS repository, and in response, will delete the corresponding entry in the postmark registry. The postmark registration agent 230 thus works to keep the postmark registry 230 as current as possible as documents in the DMS repository are added, modified, and deleted.

In one suitable embodiment, the printed document manager 125 is used in conjunction with a document management system. Thus, step 410 in FIG. 4 monitors a repository in the document management system for update documents, and step 310 in FIG. 3 monitors a repository in the document management system for documents that have not been registered in the postmark registry, such as new documents. However, an alternative embodiment does not require a formalized document management system. For example, the printed document manager 125 could be used with a Windows-based system by simply designating a folder on a computer system or network as the "DMS repository" where documents are stored. This and other variations are within the scope of the disclosure and claims herein.

FIG. 5 shows a table 510 that is one suitable implementation for the postmark registry 126 shown in FIGS. 1 and 2. Each entry in the table 510 includes the following fields: ID, DMSVolumeID, Checksum, FilePath, Filename, FileExtension, Modified Date, DeletedFlag, and Created Date, as shown in FIG. 5. A document in the DMS repository 124 can be managed by the printed document manager 125 once there is an entry in the postmark registry 510 corresponding to that document in the DMS repository 124. That data in the postmark registry, an example of which is shown in FIG. 5, is preferably used to confirm to a postmark client 210 the document about to be printed is stored in the document management system 123. In addition, once the document is printed, the data is used to connect the printed document to the soft copy document in the DMS repository by locating the corresponding entry in the postmark registry and binding the entry in the postmark entry to the printed document. The process is called binding, and is discussed in more detail below.

A postmark client (210 in FIG. 2) monitors print events and determines when to add a postmark to the printed document. Note the postmark client typically runs on a client workstation to manage printed documents that can be printed by the user using any software application running on the client workstation, regardless of whether or not the documents are stored in the DMS repository. This is one of the aspects of the printed document manager that makes it so universal and useful, the ability to manage documents printed at a client workstation even when the user does not always have the most optimal behavior in printing and saving documents and even when a document is not saved to the DMS repository.

Method 600 in FIG. 6 is preferably performed by a postmark client 210. Method 600 begins 610 when a print event is detected by the postmark client 210 (step 610). A print event can be detected by the postmark client 210 monitoring all print activity, such as anything printed on a computer system the postmark client 210 is running on, such as a user's workstation. When authorized by the postmark server, a postmark is generated for the document to be printed (step 620). The postmark is a graphical symbol as discussed in more detail herein. The postmark is preferably generated locally from data relating to the print event itself. The postmark is printed on the printed document (step 630). This is preferably done by inserting print language instructions to print the postmark with the document using the standard print driver for the selected printer. In the most preferred implementation, the postmark is printed at a preferred location, such as the top right corner of the document, unless something in the printed document would interfere with the placement of the postmark at that location. In that case, the postmark could be printed in an alternative location. The alternative location could be a second specified location on the printed page, or could be dynamically determined by processing the soft copy to determine where the postmark can be placed without interfering with the printing on the printed document. In one implementation, the postmark could be printed on each page of a multi-page printed document. In the most preferred implementation, the postmark is printed only on the first page of a multi-page document. When a document does not have sufficient space for printing the postmark, the postmark could be printed on the back side of the page, or a cover sheet can be printed that includes the postmark. The printed document is logged in the printed document store (step 640). This can be done, for example, by the postmark client sending a print pack comprising a metadata/image pair to the postmark server 220, which receives the print pack and stores the information in the print pack in the printed document store 127. The printed document optionally may also be logged in the document management system (step 650) so the DMS can manage the soft copies of printed documents in addition to managing other documents. Method 600 is then done.

Note that in addition to printing a postmark on a printed document as shown in FIG. 6, the postmark client 210 could also display a postmark in a "print preview" of a document. This would provide an easy way for a user to determine whether a document has been registered with the printed document manager, and if so, whether the placement of the postmark is acceptable to the user. The steps in FIG. 6 can be applied to this "print preview" scenario when a "print preview" is deemed to be a print event in step 610. The postmark for the document to be previewed will be generated in step 620, and will be displayed in the print preview of the document in step 630. Steps 640 and 650 would preferably not be performed for this "print preview" scenario.

A postmark is a graphical symbol that is generated from locally sourced data, which represents a combination of data that uniquely identifies a print event. FIG. 7 shows an example of a print event identifier at entry 710, which includes a FirmID, an encoded ClientID, and an encoded Date/Time value. The FirmID is a text identifier that also appears in the eye-legible portion of the postmark. In the most preferred implementation, the FirmID is a string of three characters, such as AEL shown in entry 710 in FIG. 7. In the preferred implementation, the ClientID is a string of five characters representing the specific postmark client 210 handling the print event, and the Date/Time is a string of ten characters representing the time of the print event down to the millisecond ensuring the uniqueness of the print event identifier.

Figures 9, 10:
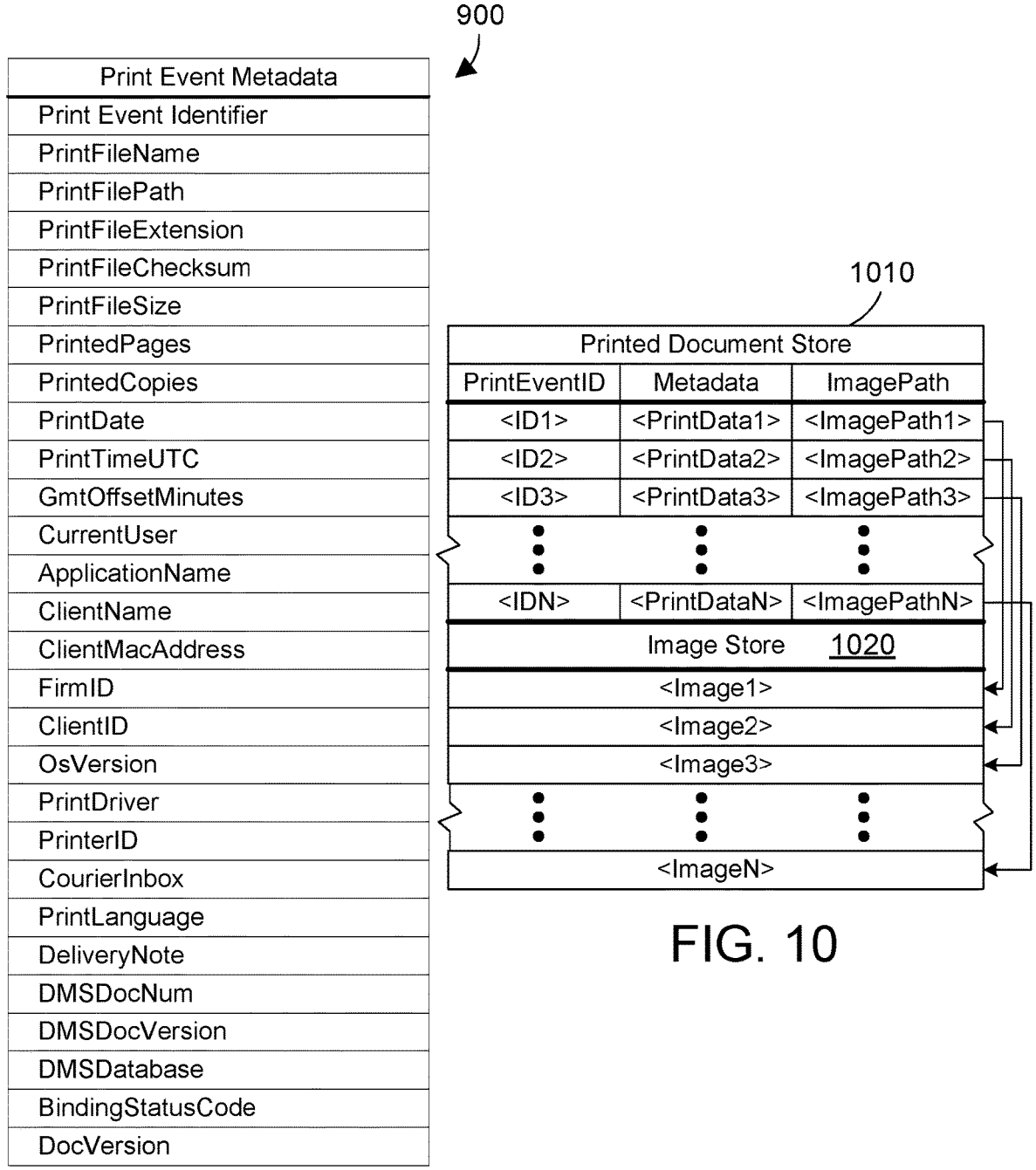
FIG. 9 is a table showing print event metadata that could be logged for a print event and which could be included in a postmark.
FIG. 10 is a table showing entries in a printed document store, which may include any suitable print event metadata, including the print event metadata shown in FIG. 9.

FIG. 8 shows that a graphical postmark 800 is divided into eye-legible portions 810 and machine-readable portion 840. Eye-legible portions 810 includes a text identifier 820, such as the FirmID AEL in FIG. 7, and additionally includes a visual indicator 830. The visual indicator can be any suitable graphic or symbol. One specific implementation of the visual indicator 830 is a checkmark. The use of the checkmark is described in the examples that follow. However, any suitable symbol or graphic could be used as a visual indicator 830, such as an asterisk, a smiley face, etc. The machine-readable portion 840 includes a print event identifier 850 that uniquely identifies a print event. The machine-readable portion 840 can be in any suitable machine-readable format, including one dimensional barcodes, two dimensional barcodes, or any other machine-readable format. In the preferred implementation, a two-dimensional barcode such as Data Matrix is used because of its compact size. The print event identifier acts as the key index for the print event metadata recorded about the printed document. The print event identifier 850 can include any suitable metadata relating to the print event. FIG. 9 shows a table with suitable examples of print event metadata 900, any of which could be incorporated into the print event identifier 850. Print event metadata 900 in FIG. 9 includes: PrintEventIdentifier, PrintFileName, PrintFilePath, PrintFileExtension, PrintFileChecksum, PrintFileSize, PrintedPages, PrintedCopies, PrintDate, PrintTimeUTC, UTCOffsetMinutes, CurrentUser, ApplicationName, ClientName, ClientMacAddress, FirmID, ClientID, OsVersion, PrintDriver, PrinterID, Courierinbox, PrintLanguage, DeliveryNote, DMSDocNum, DMSDocVersion, DMSDatabase, BindingStatusCode, and DocVersion.

The Print Event Identifier is an identifier that uniquely identifies the print event, such as print event identifier 850 shown in FIG. 8. The PrintFileName is the file name of the document being printed. The PrintFilePath is the file path of the document being printed. The PrintFileExtension is the file extension of the document being printed. The PrintFileChecksum is the checksum for the file being printed. The PrintFileSize is the size of the file being printed. The PrintedPages specifies the number of pages for the document being printed. The PrintedCopies specifies the number of copies of the document that are being printed. The PrintDate specifies the date when the document is printed. The PrintTimeUTC specifies the print time, to the millisecond, in coordinated universal time (UTC). The UTCOffsetMinutes indicates the offset, in minutes, for the location where the document is printed compared to UTC. The CurrentUser specifies the user printing the document. The ApplicationName specifies the software application printing the document, such as Microsoft Work, Outlook, etc. The ClientName specifies a name of the client workstation used by a user to print the document. The ClientMacAddress specifies the network MAC address of the client workstation used by the user to print the document. The FirmID is the firm identifier, such as the three-character identifier AEL shown in FIGS. 7 and 18. The OsVersion specifies the version of the operating system running on the workstation the user uses to print the document. The PrintDriver specifies the print driver used to print the document. The PrinterID specifies which printer is used to print the document. The Courierinbox specifies the location of the local folder where the metadata/image pair are written after printing. The PrintLanguage specifies the print language used to print the printed document, such as postscript. The DeliveryNote specifies information associated with the print document delivery to the document management system (if configured for this purpose). The DMSDocNum specifies a unique document number in the document management system that identifies the document being printed. The DMSDocVersion specifies the version of the DMS document being printed. The DMSDatabase specifies the DMS repository where the document being printed is stored. The BindingStatusCode specifies whether or not the print event is bound to a corresponding entry in the postmark registry. The DocVersion specifies the version of the document being printed.

Note the fields in the entry 710 for the print event identifier in FIG. 7 correspond to some of the fields in FIG. 9. The FirmID field in FIG. 7 corresponds to the FirmID field in FIG. 9. The ClientID in FIG. 7 corresponds to the ClientID in FIG. 9. In the preferred implementation, the print event identifier 850 reveals nothing specific about the document being printed. Rather it acts as the index to a record in the printed document store 127 that contains the print metadata that is specific about the document being printed. Any or all of the metadata shown in FIG. 9 could be included in a postmark, which could additionally include other metadata not shown in FIG. 9 as well. Because the print event identifier in FIG. 7 includes information specific to the firm and client workstation, plus a Date/Time value, and because no two documents can be printed on the same printer at the same instant in time, the print event identifier 850 makes a postmark globally unique.

One specific implementation for the printed document store 127 shown in FIGS. 1 and 2 is shown in table 1010 in FIG. 10. In this specific implementation, each entry in the printed document store includes a PrintEventID field, a metadata field, and an image path field, as shown in FIG. 10. The PrintEventID field is a key index number in the table, and comes from the print event identifier 850 value in the machine-readable portion of the postmark. The Metadata field can include any suitable print event metadata, including any or all of the print event metadata shown in FIG. 9. The ImagePath field includes a complete path and file name to the image of the printed document in the Image Store 1020, which is part of the printed document store 1010. The combination of print event metadata and an image defines what is called a "print pack", which includes all needed information about a print event and a corresponding printed document. When a postmark client 210 successfully prints a postmark on a printed document, the print pack for the printed document is sent to the postmark server, which then receives the print pack for filing in the printed document store 1010. Filing a printed document in the printed document store includes the steps of storing the image of the document in the image store 1020 and creating an entry that includes PrintEventID, Metadata, and ImagePath that points to the image in the image store 1020, as shown in FIG. 10. For the specific example in FIG. 10, each entry shown has an ImagePath that points to a different image in the Image Store 1020, as indicated by the arrows on the right side of FIG. 10. However, it is possible for multiple entries to have an ImagePath that references the same image in the Image Store 1020, as discussed below with reference to FIG. 19.

Figure 11:
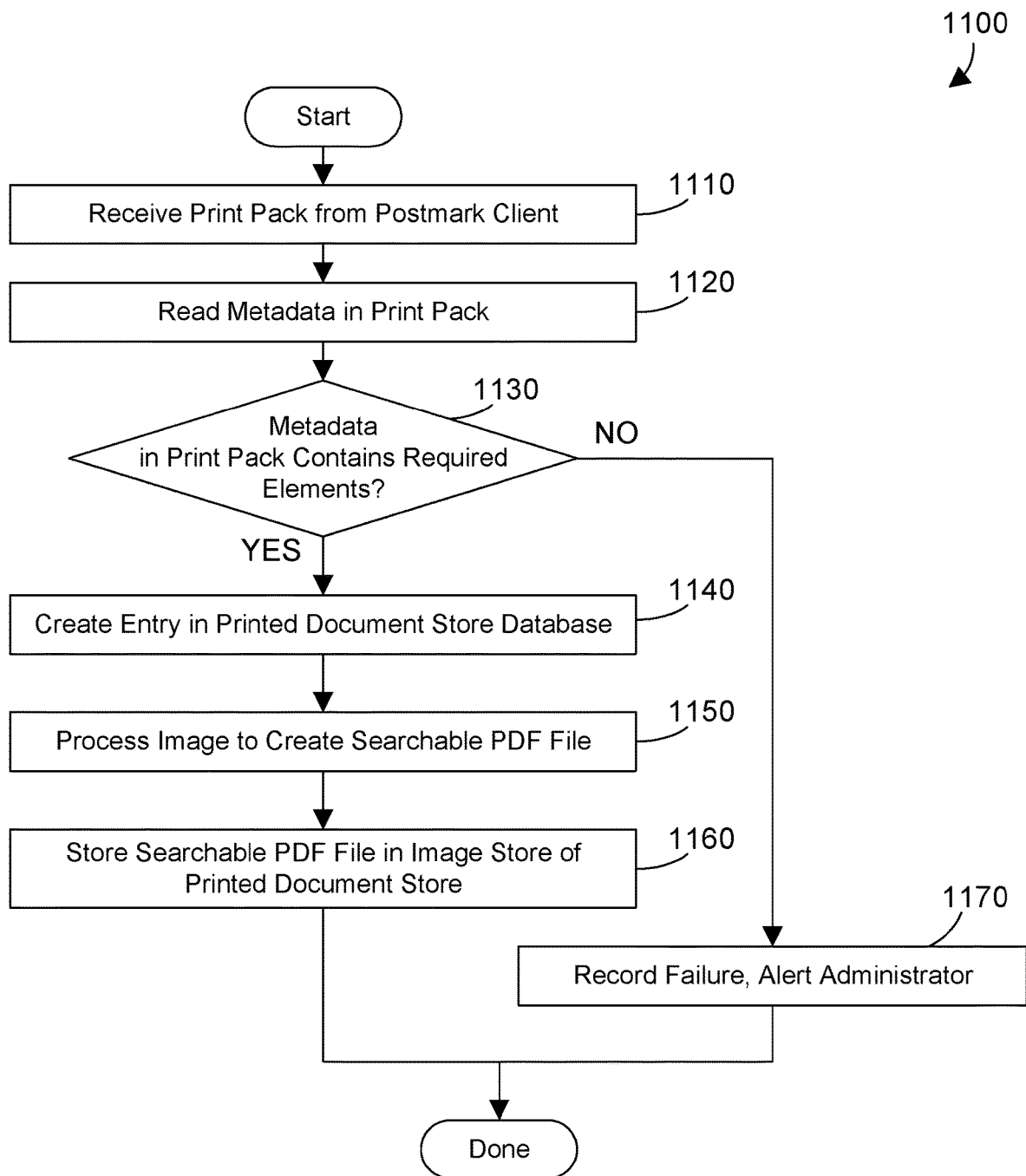
FIG. 11 is a flow diagram of a method performed by the postmark server when a metadata/image pair is received from a postmark client.
Figure 12:
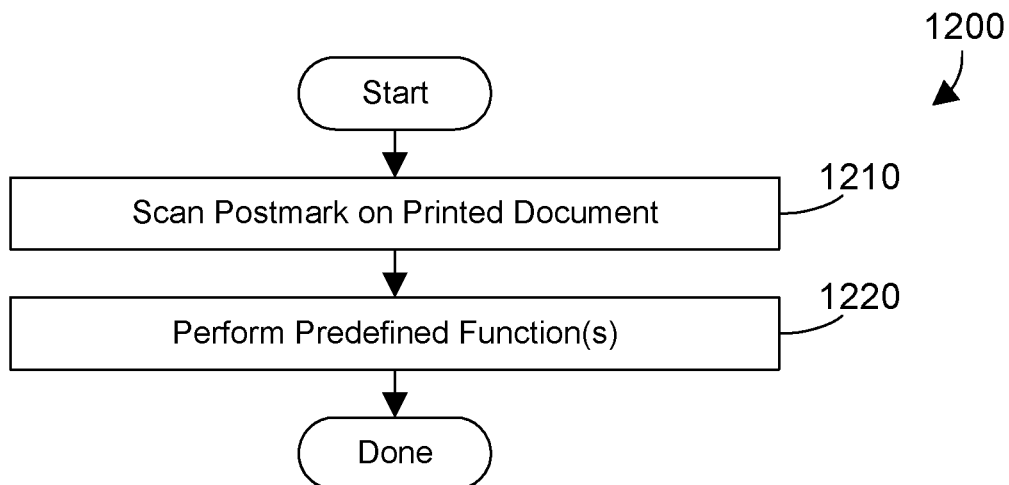
FIG. 12 is a flow diagram of a method for performing one or more predefined functions in response to scanning a postmark on a printed document.

FIG. 11 shows a method 1100 that is preferably performed by the postmark server 220 in FIG. 2. A print pack is received from a postmark client (step 1110). The metadata portion of the metadata/image pair within the print pack is read (step 1120). If the metadata contains the required field elements for creating an entry in the printed document store, such as PrintEventID, PrintFileChecksum, etc., (step 1130=YES), an entry is created in the printed document store database 1010 (step 1140). The image portion of the print pack is processed to produce a text-searchable portable document format (PDF) file (step 1150). The printed document now in searchable PDF format is logged into the printed document store (step 1160). Logging a searchable PDF document in the printed document is an advantage for unbound documents, because the searchable PDF will allow a user to search for content in a printed document to find the corresponding entry in the printed document store, even when there is no corresponding document in the DMS repository. When the metadata does not contain the required field elements (step 1130=NO), the metadata/image pair is moved to a failed folder for administrative review, and an alert is sent to a system administrator (step 1170). Method 1100 is then done. While method 1100 in FIG. 11 shows one specific way to process and store a metadata/image pair, other ways are equally within the scope of the disclosure and claims herein. For example, the reception of the print pack could initiate a binding process to connect the printed document immediately to the soft copy source document. This alternative approach may be appropriate, for example, when the printed document is to be stored in the repository of the document management system.

Having a postmark printed on a printed document provides functionality that is lacking in the prior art. Method 1200 shows a general method that includes scanning a postmark on a printed document (step 1210) and, in response, performing some set of predefined functions (step 1220). The predefined functions performed in step 1220 are preferably user-defined so the user can customize what happens when a postmark is scanned. The predefined functions can additionally include functions defined by a system administrator so that some predefined functions are defined at the system level and are available to all users, while still allowing each user to define their own predefined functions as needed. Examples follow to illustrate.

Figure 13:
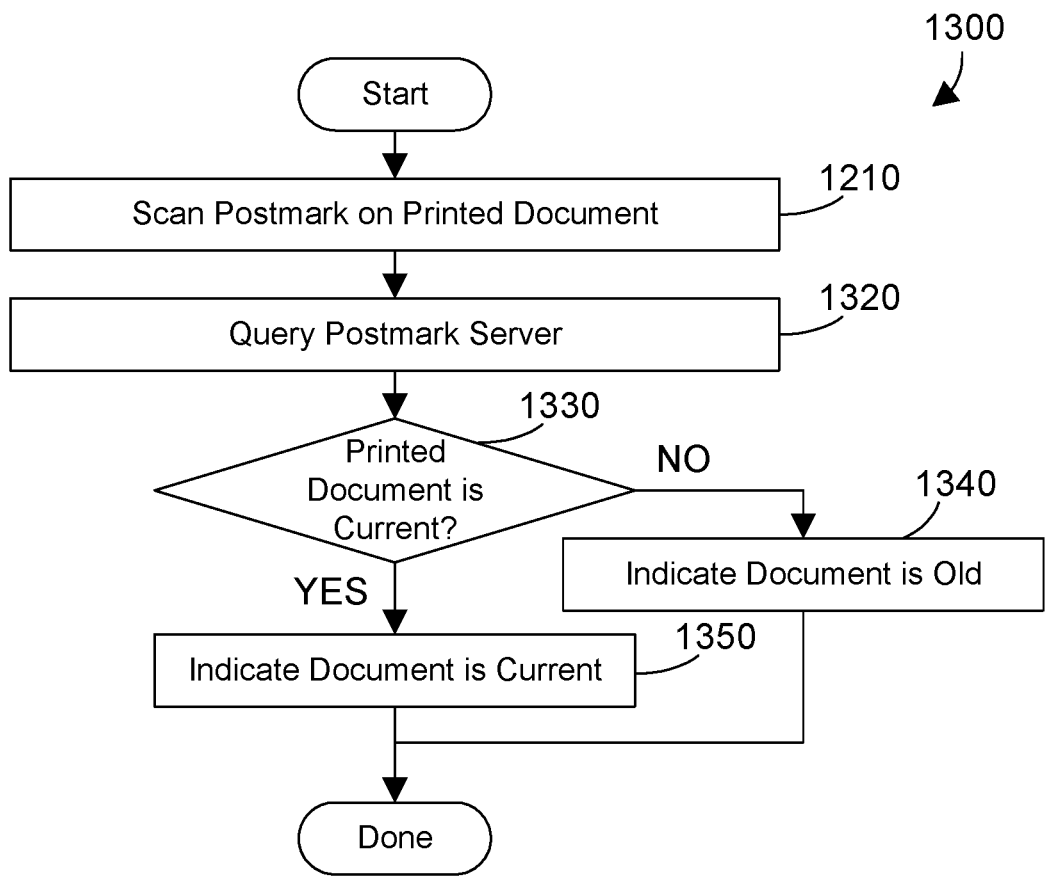
FIG. 13 is a first example method 1300 that corresponds to the general method 1200 in FIG. 12.

One function that can be performed when a postmark is scanned is determining whether a printed document is current or not, as shown in method 1300 in FIG. 13. Method 1300 is one specific example of the more general method 1200 shown in FIG. 12. The postmark on a printed document may be scanned (step 1210), for example, with a suitable bar code reader or an app on a smart phone. The postmark server is queried (step 1320) to determine whether the printed document was printed from the current version of the document or from an old version of the document. When the printed document is current (step 1330=YES), meaning the printed document corresponds to the current document in the document management system, an indication is sent that the printed document is current (step 1350). When the printed document is not current (step 1330=NO), meaning the printed document does not correspond to the current document, an indication is sent that the printed document is old (step 1340). Method 1300 is then done. Method 1300 can be useful to make sure hard copies are of the latest version of a document. For example, let's assume an attorney has a closing scheduled, and prints fifteen copies of documents that must be signed. Let's further assume the closing is delayed until two weeks later. The attorney or secretary can easily determine whether the stack of hard copies that were previously printed for signatures are current or not by scanning the postmark on one of the copies. The printed document manager will then indicate whether the printed document is the current version or not.

Figure 14:
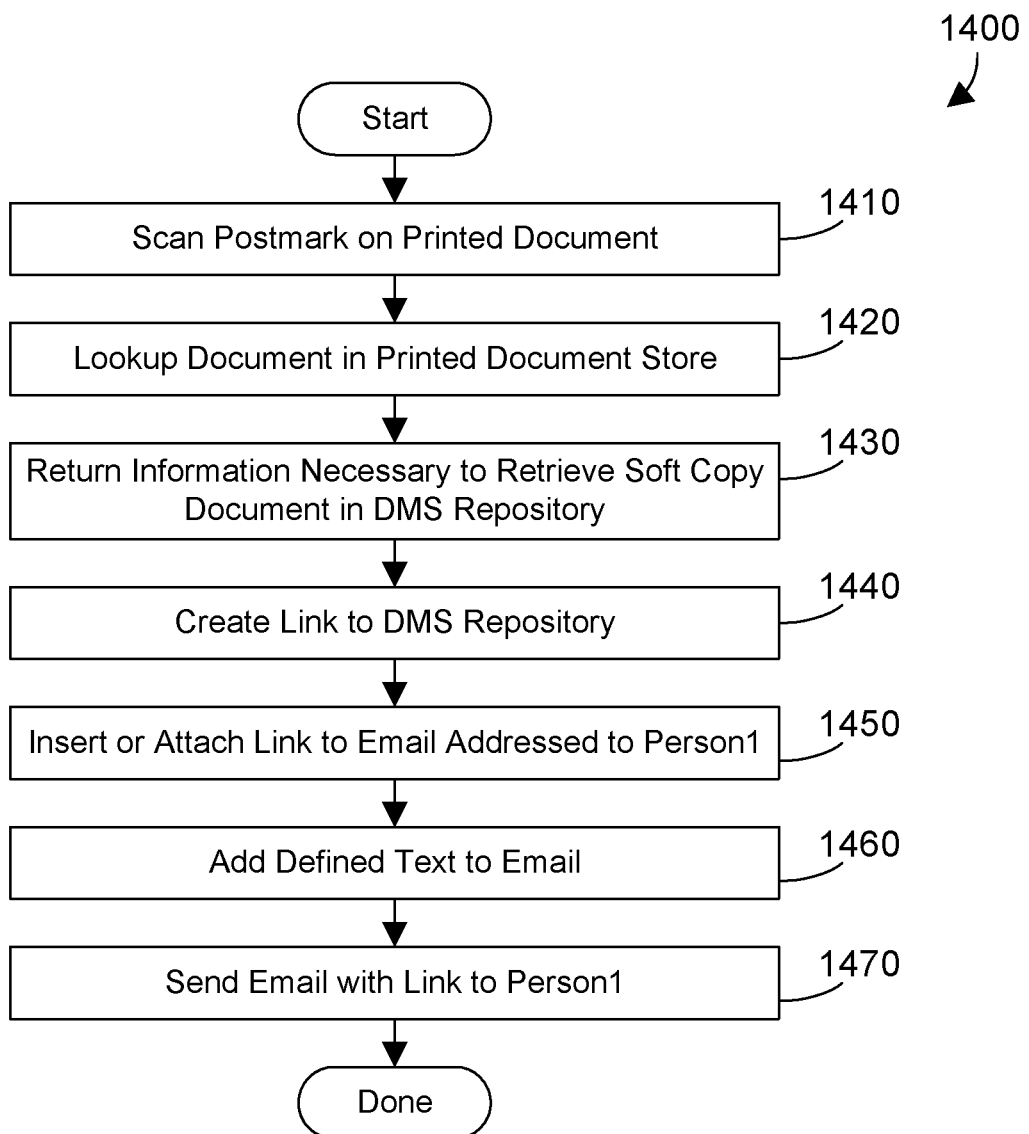
FIG. 14 is a second example method 1400 that corresponds to the general method 1200 in FIG. 12.
Figure 15:
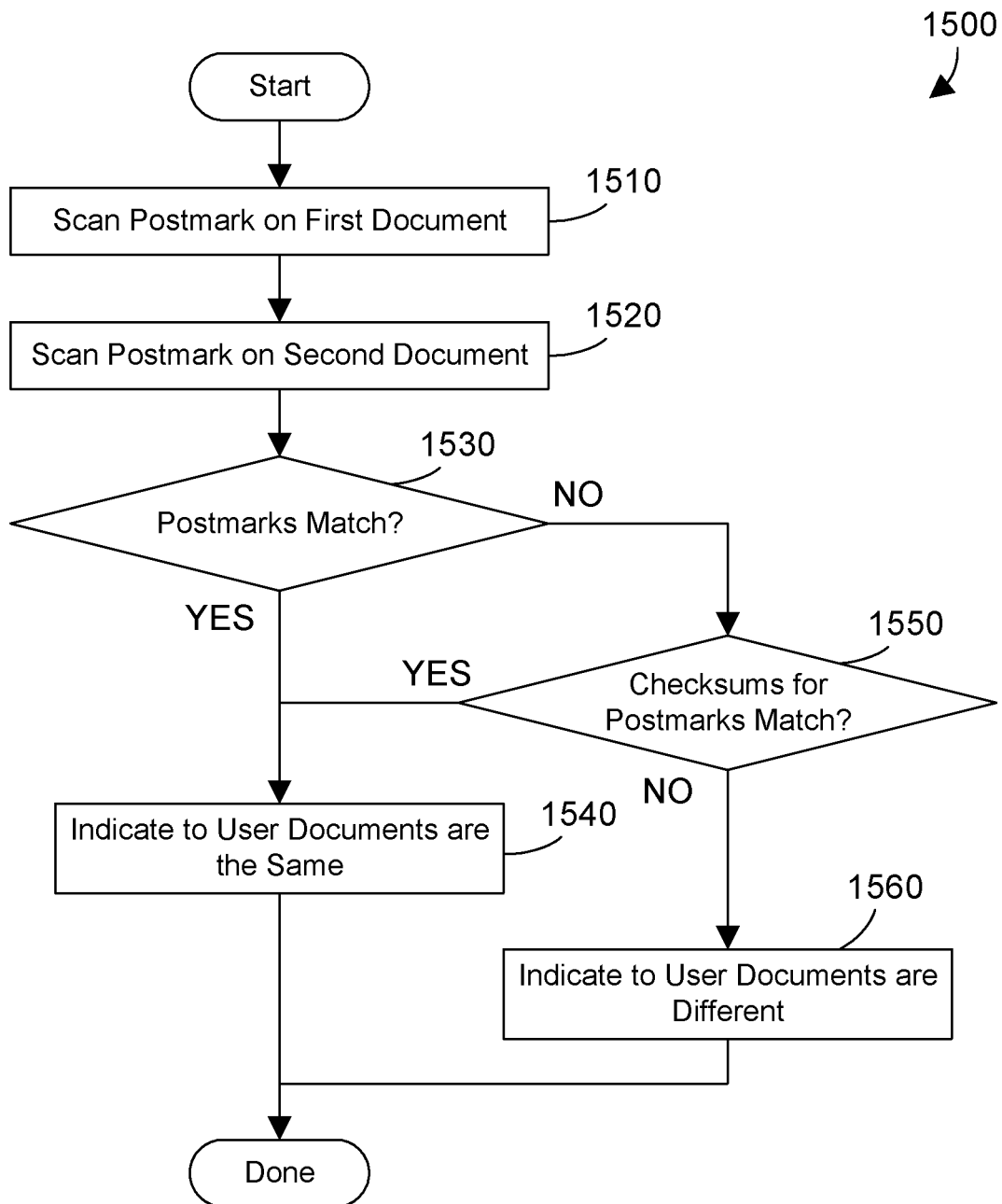
FIG. 15 is a third example method 1500 that corresponds to the general method 1200 in FIG. 12.

Another function that can be performed because of having a postmark printed on a hard copy document is to perform a more complex set of functions, as shown in method 1400 in FIG. 14. Method 1400 is one specific example of the more general method 1200 shown in FIG. 12. The postmark on a printed document is scanned (step 1410), which reads the print event identifier in the postmark. The print event identifier is used to lookup the document in the printed document store (step 1420). Assuming the printed document is bound to a soft copy document entry in the postmark registry, the lookup returns the information necessary to retrieve the corresponding document from the DMS repository (step 1430). An encoded link or file as appropriate for the DMS repository is created (step 1440), the link is inserted or attached to an e-mail addressed to Person1 (step 1450), defined text is added to the e-mail (step 1460), and the e-mail with the added text and attachment is sent to Person1 (step 1470). Method 1400 is then done. This example in FIG. 14 illustrates that any suitable set of predefined functions can be performed, which can be even more complex than the example in FIG. 14. The specific steps in method 14 could be performed by a partner in a law firm scanning a postmark on an invoice with an app on his or her mobile phone, with all of the steps in FIG. 14 being performed automatically without further interaction with the user.

FIG. 14 makes it clear that retrieving a document from the printed document store (step 1420) is a predefined function that can be performed in response to scanning a postmark. Similarly, querying a DMS repository to retrieve the document corresponding to the printed document (step 1430) is also a predefined function that can be performed in response to scanning a postmark.

Another function that can be performed is to compare the postmarks on two different printed documents. Thus, if an attorney has a printed copy of a document in her office, and the assistant also has a copy of what appears to be the same document at the assistant's desk, the two postmarks can be compared, as shown in method 1500 in FIG. 15. The postmark on the first document is scanned (step 1510). The postmark on the second document is scanned (step 1520). When the postmarks match (step 1530=YES), an indication is sent to the user that the documents are the same (step 1540) without having to query the postmark server. Because each postmark is globally unique, matching postmarks means the two printed documents were printed at the same time on the same printer. When the postmarks do not match (step 1530=NO), a check is made to see if the checksums recorded in the printed document store match (step 1550). For example, if one copy of the document is printed today, and another copy of the same document is printed tomorrow, the two postmarks will not match (step 1530=NO) but the checksums recorded in the printed document store match (step 1550=YES), which causes an indication to be sent to the user that the two documents are the same (step 1540). When the postmarks do not match (step 1530=NO) and the checksums for the documents do not match (step 1550=NO), an indication is sent to the user that the documents are different (step 1560). Method 1500 is then done. Note the indications ins steps 1540 and 1560 can be in any suitable way, including a light that turns green for matching documents and red for different documents, a message on a display of a computer or mobile phone, an audio tone, an indication on a barcode scanner, etc. Also note that when the documents are different, the indication to the user in step 1560 may include additional information, such as which document is the current document and which is the old document.

Note that default predefined functions can be defined for different scanning devices, while any suitable set of predefined functions can be selected at each of the scanning devices. For example, let's assume an assistant for Partner A has a barcode scanner that performs method 1300 by default when a postmark is scanned, but can also select from different sets of predefined functions when method 1300 is not what is wanted. Partner A could have on her mobile phone an app that scans a postmark and performs method 1400 by default, but can also select from different sets of predefined functions when method 1400 is not what is wanted. The predefined functions in step 1220 can be defined in any suitable way, and expressly include any and all combinations of functions that can be defined by a user, a system administrator, or other entity.

Figure 16:
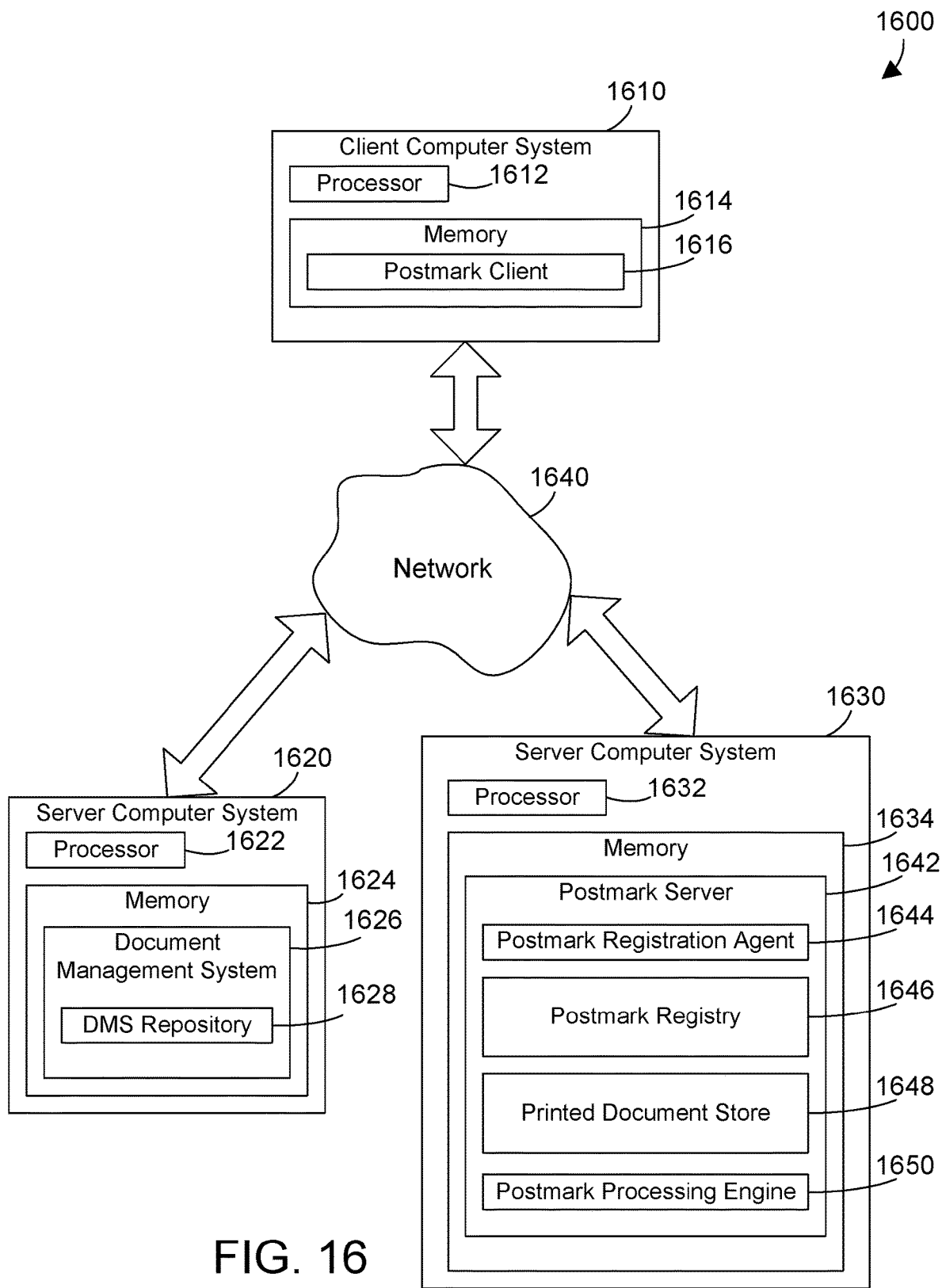
FIG. 16 is a block diagram showing a first suitable implementation for the components in the printed document manager shown in FIGS. 1 and 2 on different computer systems.

As stated above, the embodiment of the printed document manager 125 shown in FIG. 2 can include multiple components that can be implemented on multiple computer systems. FIG. 16 shows one suitable configuration for many of the components shown in FIG. 2 in a networked computer system 1600. A client computer system 1610 is coupled to two server computer systems 1620 and 1630 via a network 1640. The client computer system 1610 includes one or more processors 1612 and a memory 1614 that includes the postmark client 1616 that is executed by the one or more processors 1612. Postmark client 1616 is one suitable example of postmark client 210 shown in FIG. 2. Postmark client 1616 can perform functions such as method 600 in FIG. 6 and methods 1200, 1300, 1400 and 1500, as shown in FIGS. 12, 13, 14 and 15, respectively. The server computer system 1620 includes one or more processors 1622 and a memory 1624 that includes the document management system 1626 that is executed by the one or more processors 1622, and one or more DMS repositories 1628. DMS 1626 and DMS repository 1628 are specific examples of DMS 123 and DMS repository 124, respectively, shown in FIGS. 1 and 2. While the DMS 1626 and DMS repository 1628 are shown on the same server computer system 1620, it is understood in the art that the document management system 1626 can manage one or more DMS repositories that are stored on separate server computer systems. The server computer system 1630 includes one or more processors 1632 and a memory 1634 that includes the postmark server 1642, which includes the postmark registration agent 1644, the postmark registry 1646, the printed document store 1648 and the postmark processing engine 1650. The postmark server 1642, postmark registration agent 1644, postmark registry 1646, printed document store 1648, and postmark processing engine 1650 are specific examples of the postmark server 220, postmark registration agent 230, postmark registry 126, printed document store 127, and postmark processing engine 240, respectively, shown in FIG. 2. Note the postmark processing engine 1650 in FIG. 16 preferably includes the items shown in the postmark processing engine 240 in FIG. 2. The postmark registration agent 1644 can perform functions such as methods 300 and 400 in FIGS. 3 and 4, respectively. The postmark registry 1646 is a database of documents in the DMS repository 124 that have been registered to be managed by the printed document manager, an example of which is shown in FIG. 5. The printed document store 1648 is the database of printed documents, which can include bound printed documents and unbound printed documents, as shown in FIG. 2. The printed document store 1648 comprises entries that each includes a metadata/image pair as shown in FIG. 10, where the metadata includes one or more attributes that describe the printed document, and the image is an image of the printed document. The postmark processing engine 1650 performs various functions, such as method 1100 in FIG. 11, method 1700 in FIG. 17, method 1900 in FIG. 19, methods 2200, 2300 and 2400 in FIGS. 22, 23 and 24, respectively, and portions of methods 2500, 2600, 2700, 2800 and 2900 in FIGS. 25, 26, 27, 28 and 29, respectively.

Figure 17:
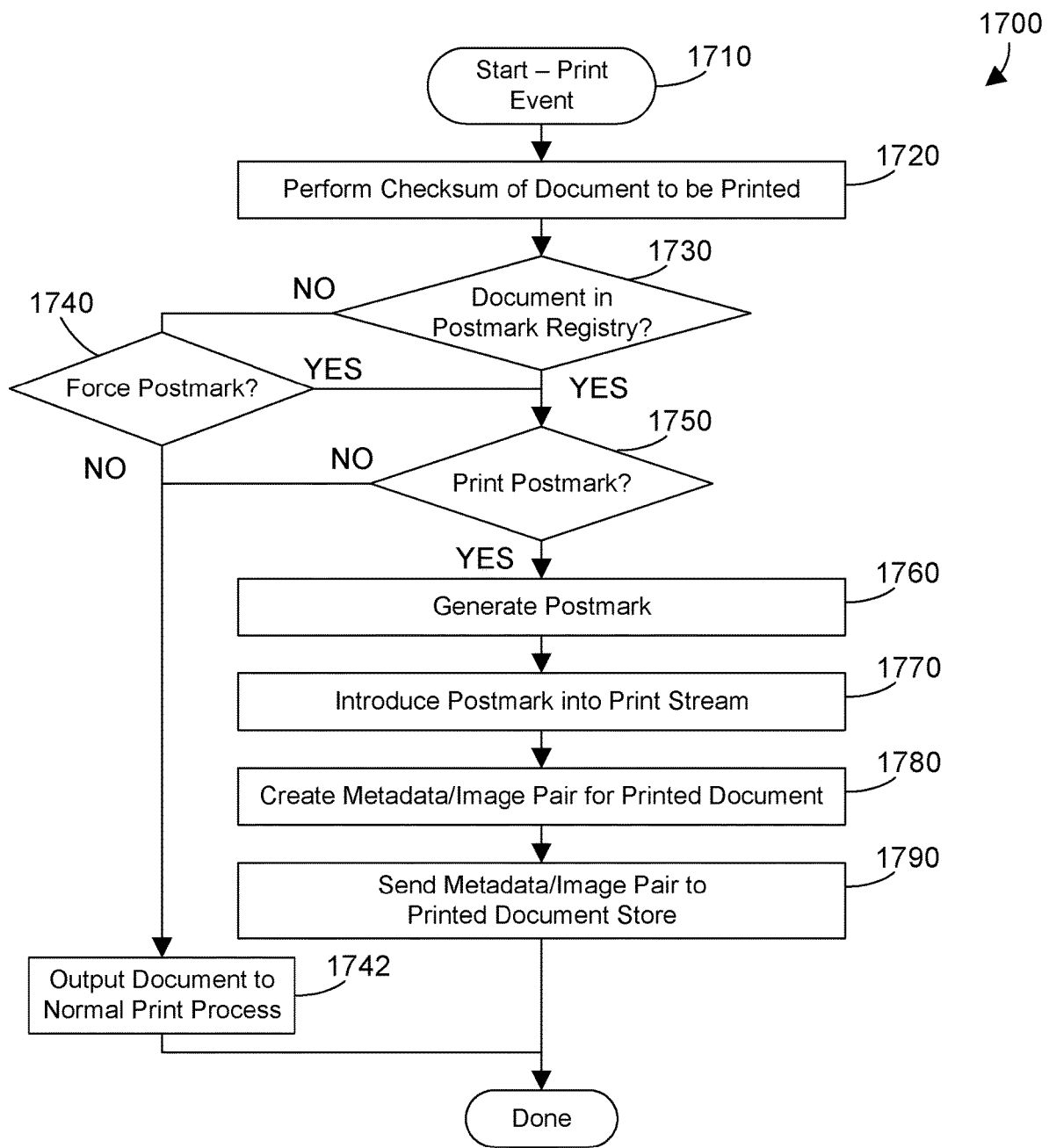
FIG. 17 is a method that is preferably performed by printed document manager shown in FIGS. 1 and 2.

Referring to FIG. 17, a method 1700 represents a general method that describes functions that are performed by different components in the printed document system. Method 1700 starts by detecting a print event (step 1710). A checksum is then performed of the document to be printed (step 1720). Steps 1710 and 1720 are preferably performed by a postmark client 210. When the document is not in the postmark registry (step 1730=NO), and when the user does not specify to force a postmark (step 1740=NO), the document is output to the normal print process (step 1742), which means the printed document does not receive a postmark. When the document is in the postmark registry (step 1730=YES), or when the document is not in the postmark registry (step 1730=NO) and the user specifies to force a postmark (step 1740=YES), when printing the postmark is not specified (step 1750=NO), the document it output to the normal print process (step 1742), which means the printed document does not receive a postmark. When the document is in the postmark registry (step 1730=YES), or when the document is not in the postmark registry (step 1730=NO) and the user specifies to force a postmark (step 1740=YES), when printing the postmark is specified (step 1750=YES), the postmark is generated (step 1760), the postmark is introduced into the print stream (step 1770), a print pack comprising a metadata/image pair for the printed document is created (step 1780), and the print pack comprising the metadata/image pair is s sent to the printed document store (step 1790). Method 1700 is then done. Note that all of the steps in FIG. 17 are preferably performed by the postmark client with the exception of determining whether the document is in the postmark registry in step 1730, which is preferably performed by the postmark processing engine in the postmark server.

Figure 18:
FIG. 18 is a diagram showing a suitable embodiment of a printed document that includes a postmark.

Referring to FIG. 18, a sample printed document 1810 is an invoice for a law firm, and includes a printed postmark 1820. The printed postmark 1820 is one suitable example of the printed postmark 800 shown in FIG. 8. The three characters AEL at 1830 in FIG. 18 correspond to one suitable implementation for the text identifier 820 shown in FIG. 8, while the checkmark 1840 in FIG. 18 corresponds to one suitable implementation for the visual indicator 830 in FIG. 8. Because the checkmark 1840 is present, this means the printed document 1810 was printed from a document that exactly matched the document stored in the DMS repository. A two-dimensional square barcode 1850 encodes data used to generate the postmark that is not eye-legible, which corresponds to one suitable implementation for the print event identifier 850 in the machine-readable portion 840 in FIG. 8. In the sample printed document 1810 shown in FIG. 18, the postmark 1820 is placed in the upper right corner of the document. However, as discussed above, the postmark may be printed on any suitable location on the printed document and can even be printed on a cover sheet or on the back side of the printed document.

Figure 19:
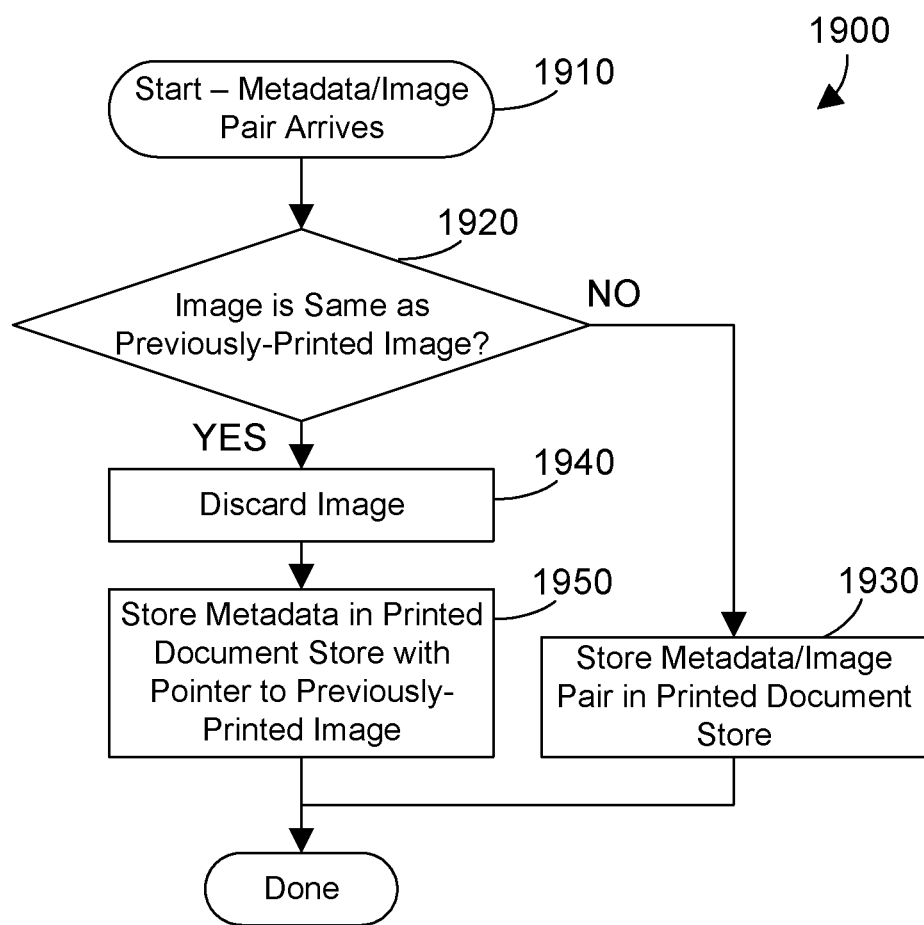
FIG. 19 is a flow diagram of a method for storing a printed document in the printed document store.

Some documents may be printed repeatedly at different times. The printed document manager thus preferably includes a mechanism for detecting when a document that has been printed is the same as a document that was previously printed. When a postmark client prints a printed document with a postmark, the postmark client sends the print pack comprising the metadata/image pair to the postmark processing engine, which in turn, receives the print pack at the postmark server. Referring to FIG. 19, method 1900 is preferably performed by the postmark processing engine, and begins when the metadata/image pair arrives from a postmark client (step 1910). When the image is not the same as a previously-printed image (step 1920=NO), the metadata/image pair is stored in the printed document store (step 1930). When the image is the same as a previously-printed image (step 1920=YES), the image portion of the metadata/image pair is discarded (step 1940) and the metadata portion of the metadata/image pair is stored in the printed document store with a pointer to the previously-printed image (step 1950). One suitable way to determine whether the image is the same is to compare a checksum for the image to checksums for images stored in the printed document store. In this manner the printed document store still tracks each print event without having to store multiple copies of the same image for different print events. Thus, if the entry in the Printed Document Store 1010 in FIG. 10 with a PrintEventID of 3 was a print event for the same document that has the same checksum as the entry for the PrintEventID of 1, the <ImagePath3> could point to <Image1> in the image store, which saves the space of having to store two identical images of a printed document in the image store.

In one exemplary embodiment, text could be printed with the postmark. For example, a law firm may want to print "Attorney-client Privileged" on each page of certain printed documents, or other text such as "Subject to XX Protective Order" or "Attorney Eyes Only." The disclosure and claims herein extend to printing any suitable text or information with a postmark on a printed document.

As discussed in detail above, a print pack includes a metadata/image pair, where the metadata includes at least one attribute that describes the printed document and the image is an image of the printed document. One suitable example of metadata that could be included in a metadata/image pair is a file in eXtensible Markup Language (XML). One suitable implementation of an XML file that could be metadata in a metadata/image pair is shown in FIG. 9 to include many different attributes that relate to a printed document. Of course, other attributes relating to the printed document could also be included in the metadata. The disclosure and claims herein expressly extend to any suitable metadata that could be stored in a metadata/image pair to describe some attribute related to the printed document.

Figure 20:
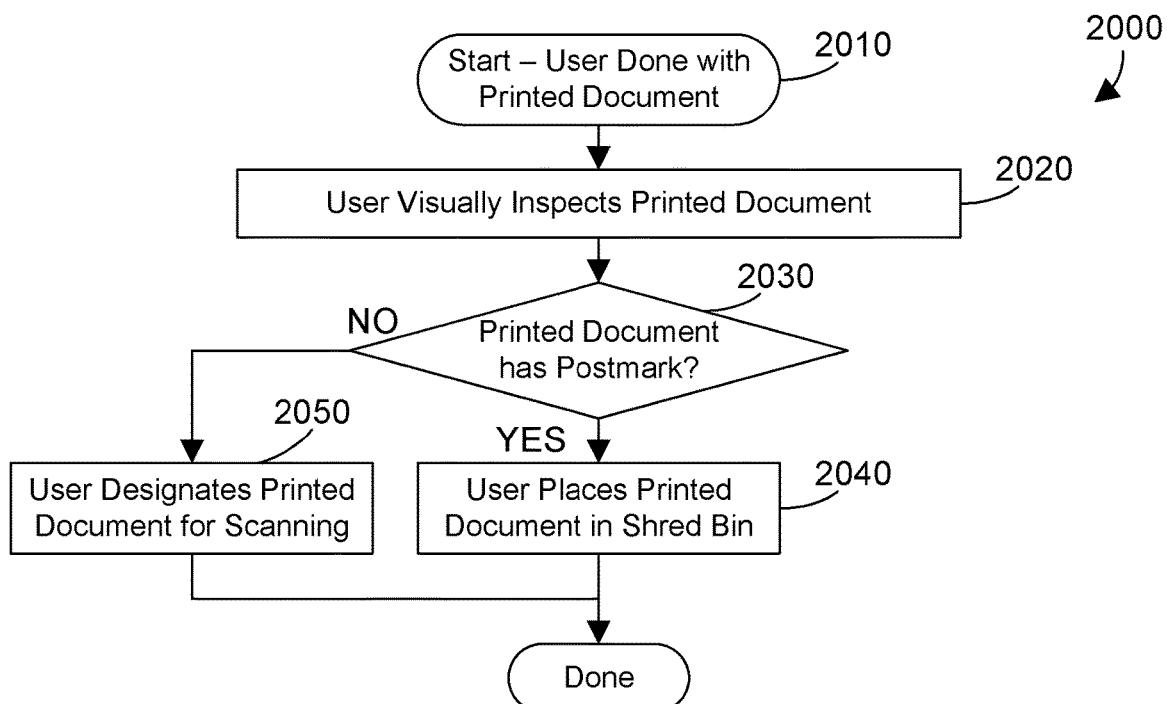
FIG. 20 is a flow diagram of a method for determining disposition of a printed document when a user has finished with the printed document.

One of the advantages of having a postmark printed on printed documents is the postmark provides a visual indication that the document was printed from a document in the DMS repository managed by the document management system (DMS). The postmark thus serves as a visual indication that the document may be discarded or shredded when it is no longer needed. Referring to FIG. 20, method 2000 begins when a user is done with a printed document (step 2010). The user visually inspects the printed document (step 2020). When the printed document has a postmark (step 2030=YES), the user knows the printed document has been captured by the printed document manager, so the user can discard the printed document by placing the printed document in a shred bin for disposal (step 2040). When the printed document does not have a postmark (step 2030), this is a visual indication to the user that the printed document may have come from outside the firm and requires further handling. The user could designate the printed document for scanning (step 2050) so the document can be scanned and stored in the DMS. A user could designate the printed document for scanning in step 2050 by placing the document in a bin designated for documents to be scanned. While method 2000 seems simple, it is a very powerful tool to be able to visually determine based on a postmark that a printed document can be shredded instead of retained when the printed document is no longer needed. Without the ability to quickly determine whether a printed document should be shredded or not, many people that use known document management systems simply re-file the printed document, incurring the corresponding labor, cost and risk associated with managing two copies of the same document.

The printed document manager could also provide additional functions. For example, the printed document manager could control the number of printed documents printed from a particular file in the document management system. Thus, if a company is involved in litigation, and is required to produce a specified number of printed copies, the printed document manager could keep track of who printed the document so the copy can be returned or destroyed before more copies are printed. In addition, the printed document manager could be used in a system that prints with magnetic ink to assure printed documents do not leave the premises. Of course, many other functions could be performed by the printed document manager disclosed herein.

Figure 21:
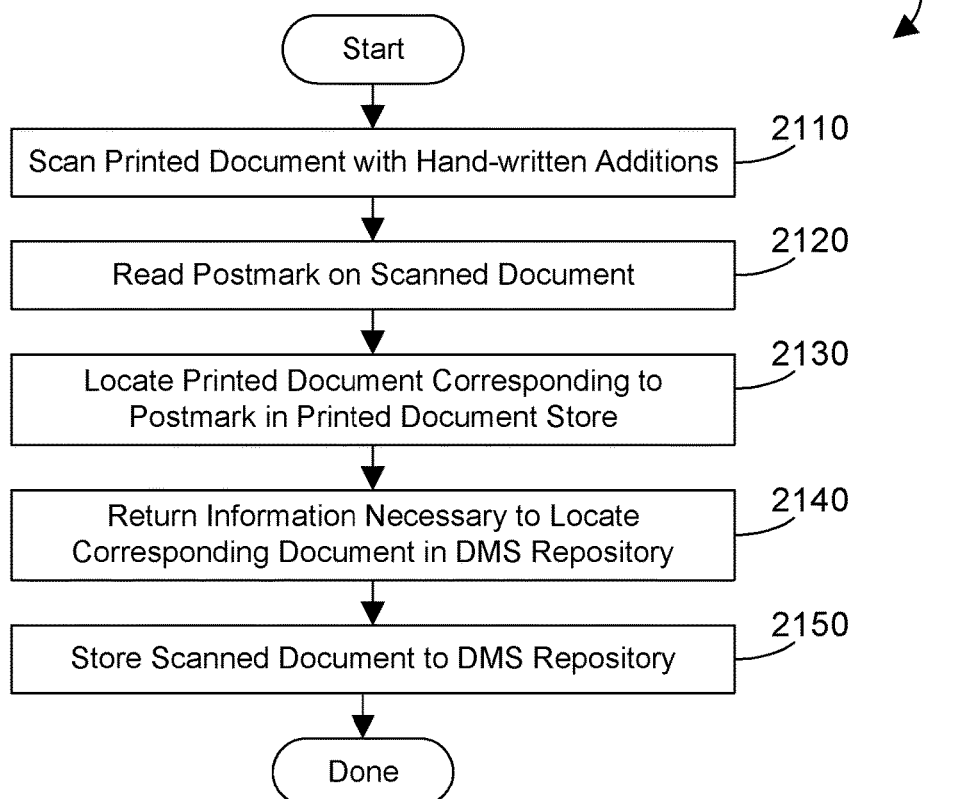
FIG. 21 is a flow diagram of a method for storing a hard copy that has hand-written annotations as an electronic version of the printed document.

Another function that can be performed because of having a postmark printed on a hard copy document is the storing of hand-written additions to a printed document as a version of the document in the DMS repository. Referring to FIG. 21, method 2100 begins by scanning a printed document that has hand-written additions (step 2110). Many people hand-write notes, diagrams, and add other material right on the printed document. When the person wants his or her hand-written additions to be saved in the document management system, the person can place the hard copy with the hand-written additions in a scan bin so the document is scanned for entry into the DMS. The scanning of the document is done in step 2110. The postmark on the scanned document is read (step 2120). The printed document corresponding to the postmark is located in the printed document store (step 2130). Assuming the printed document is bound to a soft copy document entry in the postmark registry, the lookup returns information necessary to locate the corresponding document in the DMS repository (step 2140). The printed document manager uses the information to store the scanned document to an appropriate location with respect to the corresponding document in the DMS repository (step 2150). Method 2100 is then done. The printed document manager thus has the capability of automatically storing hand annotated versions of a printed document within the document management system enabling it to be managed electronically rather than in paper form.

Figure 22:
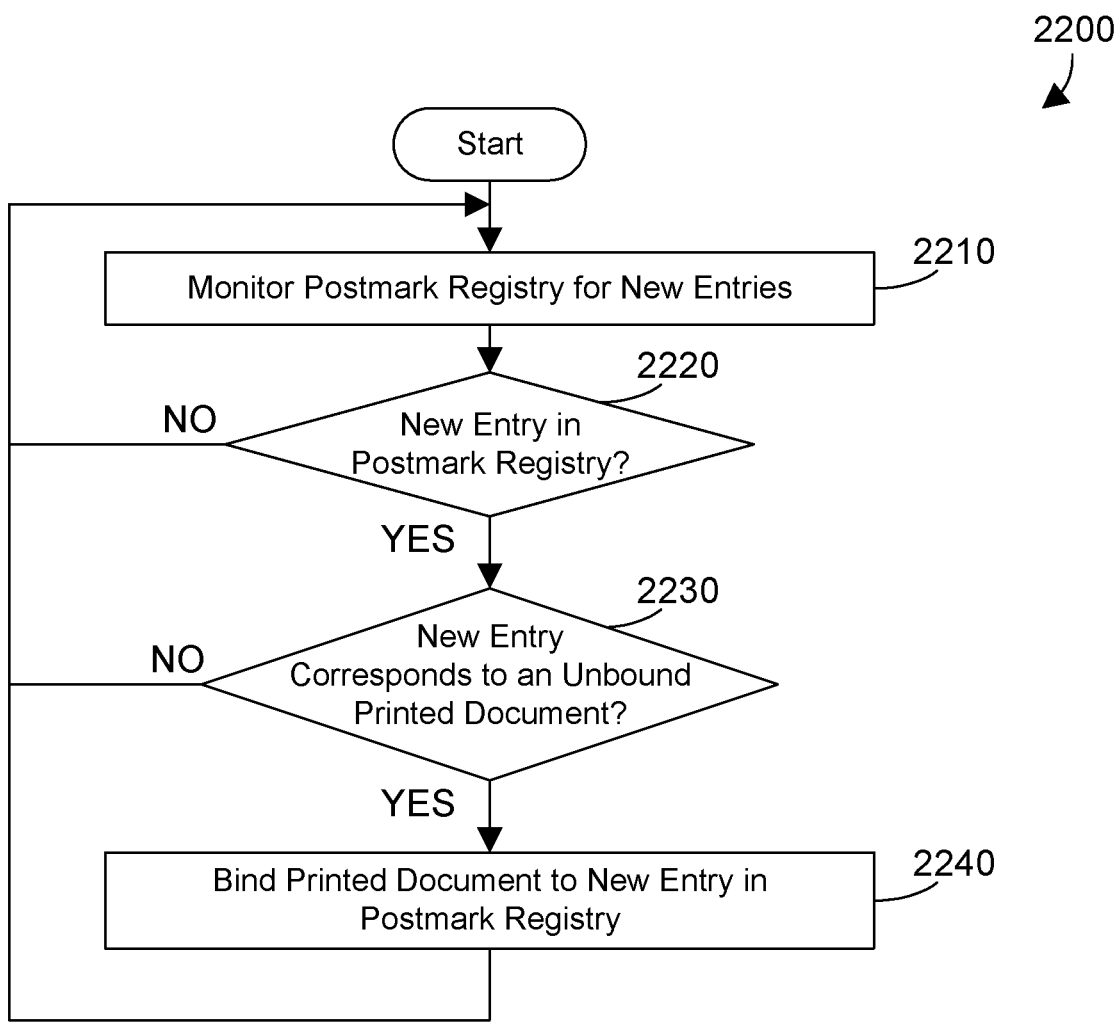
FIG. 22 is a flow diagram of a method that is preferably performed by the printed document binding process 252 in FIG. 2 for binding printed documents to documents registered in the postmark registry.

Method 2200 in FIG. 22 represents steps that are preferably performed by the printed document binding process 252 shown in FIG. 2. The printed document binding process 252 continuously scans the postmark registry for new entries, and when a new entry is detected, attempts to bind any unbound documents to the new entry. The postmark registry is monitored for new entries (step 2210). When there is no new entry in the postmark registry (step 2220=NO), method 2200 loops back to step 2210 and continues until a new entry in the postmark registry is detected (step 2220=YES). When the new entry does not correspond to any unbound printed document in the printed document store (step 2230=NO), method 2200 loops back to step 2210 and continues. When the new entry corresponds to one of the unbound printed documents in the printed document store (step 2230=YES), the unbound printed document is bound to the new entry in the postmark registry (step 2240). This binding occurs by linking the common field elements such as Filename with PrintFileName and/or Checksum with PrintFileChecksum. The BindingStatusCode in the print event metadata is updated to reflect this linkage. The determination of whether a printed document stored in the printed documents store is bound or unbound is reflected in the value of the BindingStatusCode, where one value indicates the printed document is bound, and a different value indicates the printed document is unbound.

The postmark processing engine 240 in the postmark server 220 in FIG. 2 may include a printed document retention and purge tool 260 that functions according to one or more retention policies or purge policies to retain or purge documents from the printed document store. In the most preferred implementation, there is a bound document purge policy 262 that is separate from an unbound document purge policy 264, as shown in FIG. 2. Method 2300 is preferably performed by the printed document retention and purge tool 260 in FIG. 2. A bound printed document is selected (step 2310). When the selected bound document satisfies the bound document purge policy (step 2320=YES), the selected bound printed document is purged from in the printed document store (step 2340). When the selected bound document does not satisfy the bound document purge policy (step 2320=NO), the selected bound printed document is retained in the printed document store (step 2330). Method 2400 in FIG. 24 performs very similar steps as method 2300 in FIG. 23, but for unbound printed documents based on the unbound document purge policy. Thus, an unbound printed document is selected (step 2410). When the selected unbound printed document satisfies the unbound document purge policy (step 2420=YES), the unbound printed document is purged from the printed document store (step 2440). When the selected unbound document does not satisfy the unbound document purge policy (step 2420=NO), the selected unbound printed document is retained in the printed document store (step 2430). Methods 2300 and 2400 in FIGS. 23 and 24, respectively, show that different purge policies can be defined for bound and unbound documents so these can be managed differently. For example, a firm using the printed document manager could define a three year retention period for bound printed documents, and a five year retention period for unbound printed documents. Because the only record of an unbound printed document is in the printed document store, the retention policy for unbound printed documents could be set to be longer than the normal retention policy for bound printed documents. Note the purge policies disclosed herein would simply indicate that when a specified retention period is exceeded, a document will be purged.

Figure 25:
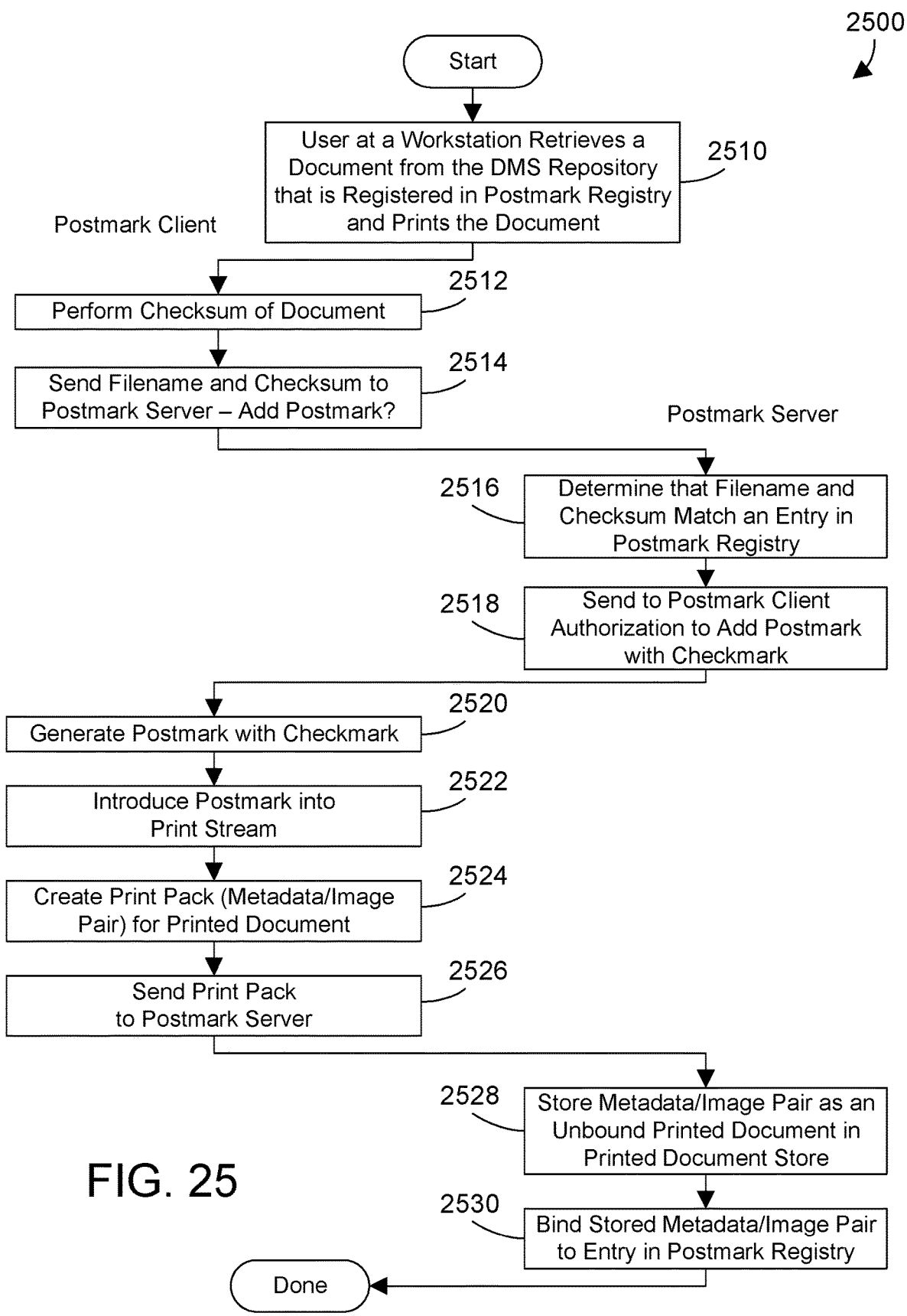
FIG. 25 is a flow diagram of a method preferably illustrating a first specific use case for the printed document manager.

FIGS. 25-29 illustrate some specific examples of use cases of the printed document manager and interactions between a postmark client and the postmark server. Note the postmark server preferably includes many different functions and features as shown in FIG. 2, but for the sake of the example use cases herein, the postmark server is said to perform the functions of its various components. A first sample use case shown in method 2500 in FIG. 25 illustrates steps that are performed when a user at a workstation retrieves a document from the DMS repository that is registered in the postmark registry and prints the document (step 2510). In response to detecting the print event, the postmark client performs a checksum of the document (step 2512). As stated above, this could be done, for example, using a checksum utility provided by the operating system at the user's workstation. The filename and checksum is sent to the postmark server to determine whether the postmark client should add a postmark (step 2514). The postmark server determines both the filename and checksum received from the postmark client match an entry in the postmark registry (step 2516). In response, the postmark server sends to the postmark client authorization to add a postmark with a checkmark (step 2518) because both the filename and checksum match. The postmark client then generates the postmark with the checkmark (step 2520). The checkmark provides a visual indication to the user that indicates the printed document exactly matches the document in the DMS repository. The postmark is introduced into the print stream (step 2522). The postmark client then creates a print pack comprising a metadata/image pair for the printed document (step 2524). The print pack is sent by the postmark client to the postmark server (step 2526). The postmark server then receives and processes the metadata/image pair, storing it as an unbound printed document in the printed document store (step 2528). Because the printed document corresponds to a document in the DMS repository that has an entry in the postmark registry, the stored printed document is bound to the corresponding entry in the postmark registry (step 2530), which changes the status from an unbound printed document to a bound printed document. Method 2500 is then done. The sample use cases in methods 2500-2900 in FIGS. 25-29 assume all documents are initially stored in the printed document store as unbound printed documents, and it is the job of the printed document binding process 252 shown in FIG. 2 to continuously monitor the unbound printed documents and the postmark registry in an attempt to bind unbound printed documents to corresponding entries in the postmark registry. Of course, it is equally within the scope of the disclosure and claims herein for the postmark server to recognize at step 2528 the metadata/image pair has a corresponding entry in the postmark registry, which means the printed document could be immediately stored with a status of bound in the printed document store, rather than storing the document as an unbound printed document, then waiting for the printed document binding process to bind the unbound printed document to its corresponding entry in the postmark registry.

Figure 26:
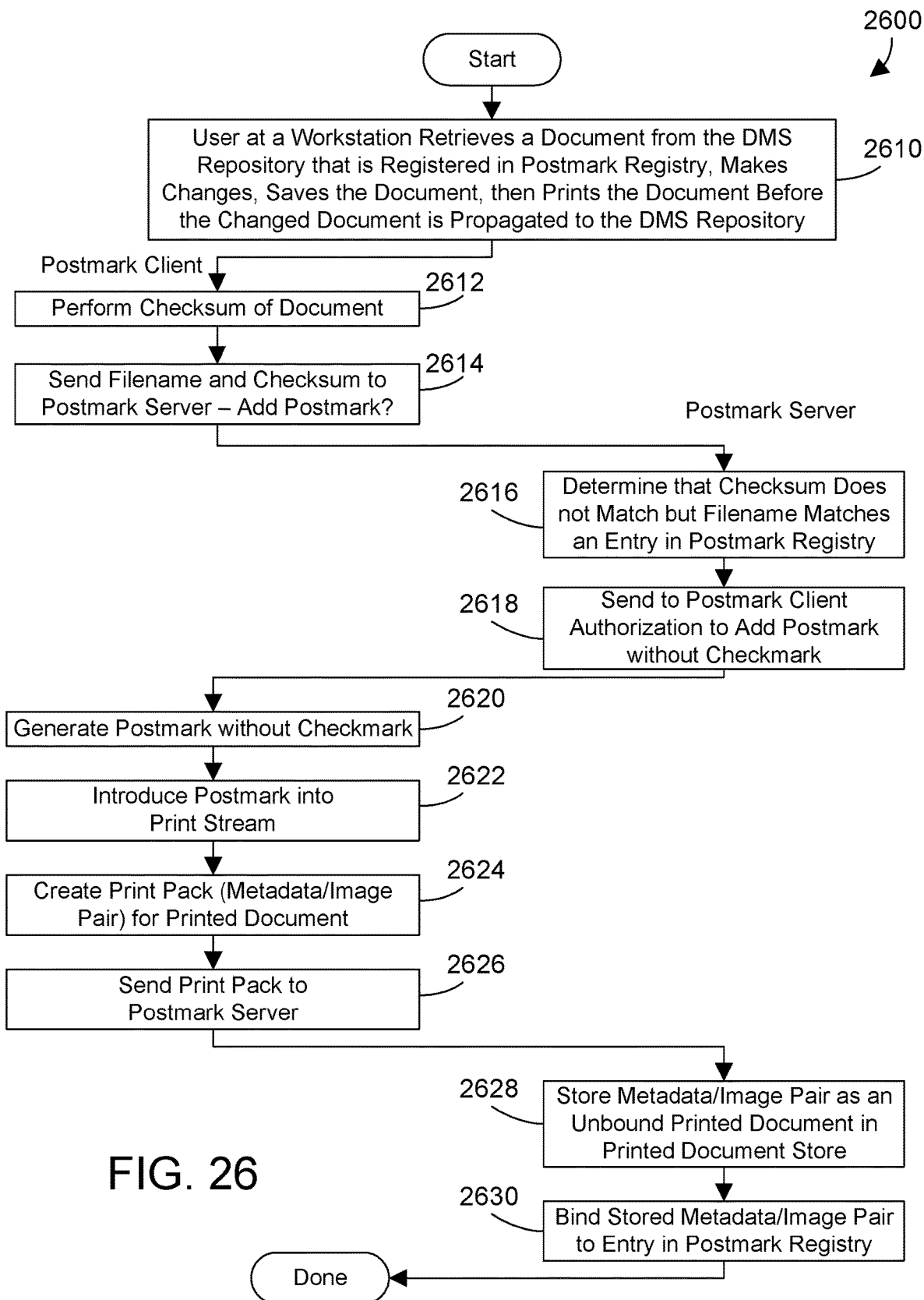
FIG. 26 is a flow diagram of a method preferably illustrating a second specific use case for the printed document manager.

A second sample use case is shown as method 2600 in FIG. 26, and is initiated when a user at a workstation retrieves a document from the DMS repository that is registered in the postmark registry, makes changes, saves the document, then prints the document before the change is propagated to the DMS repository (step 2610). Most DMS system have local directories on a client workstation that are automatically synchronized to the DMS repository. This means when a client makes changes to a document, then saves the document, then immediately prints, the saved document on the client's workstation may not have yet propagated to the DMS repository. The postmark client detects the print event, and in response, performs a checksum of the document being printed (step 2612). The filename and checksum are sent to the postmark server to determine whether the postmark client should add a postmark to this printed document (step 2614). The postmark server receives the filename and checksum from the postmark client, and determines the checksum does not match, but the filename matches an entry in the postmark registry (step 2616). In the most preferred implementation, the postmark server will authorize a postmark when the checksum matches, when the filename matches, or both. Because the filename matches, the postmark server sends authorization to the postmark client to add the postmark without the checkmark (step 2618) because the printed document does not match the current document in the DMS repository, as indicated by the mismatch in checksums. The postmark client generates the postmark without the checkmark (step 2620), introduces the postmark into the print stream (step 2622), creates a print pack comprising a metadata/image pair for the printed document (step 2624), and sends the print pack to the postmark server (step 2626). The postmark server receives and processes the metadata/image pair, storing it as an unbound printed document in the printed document store (step 2628). Even though the checksum does not match, the metadata/image pair is still bound to the corresponding entry in the postmark registry based on the match in filename (step 2630). Method 2600 is then done. Note that once the changed document referenced in step 2610 is propagated to the DMS repository, method 400 in FIG. 4 will detect the updated document (step 420=YES0, generate a new checksum for the updated document (step 430), and update the entry for the existing document in the postmark registry to include the new checksum (step 440). At this point, the postmark server can recognize the updated document, and update the entry in the printed data store to indicate the matching checksum.

Figure 27:
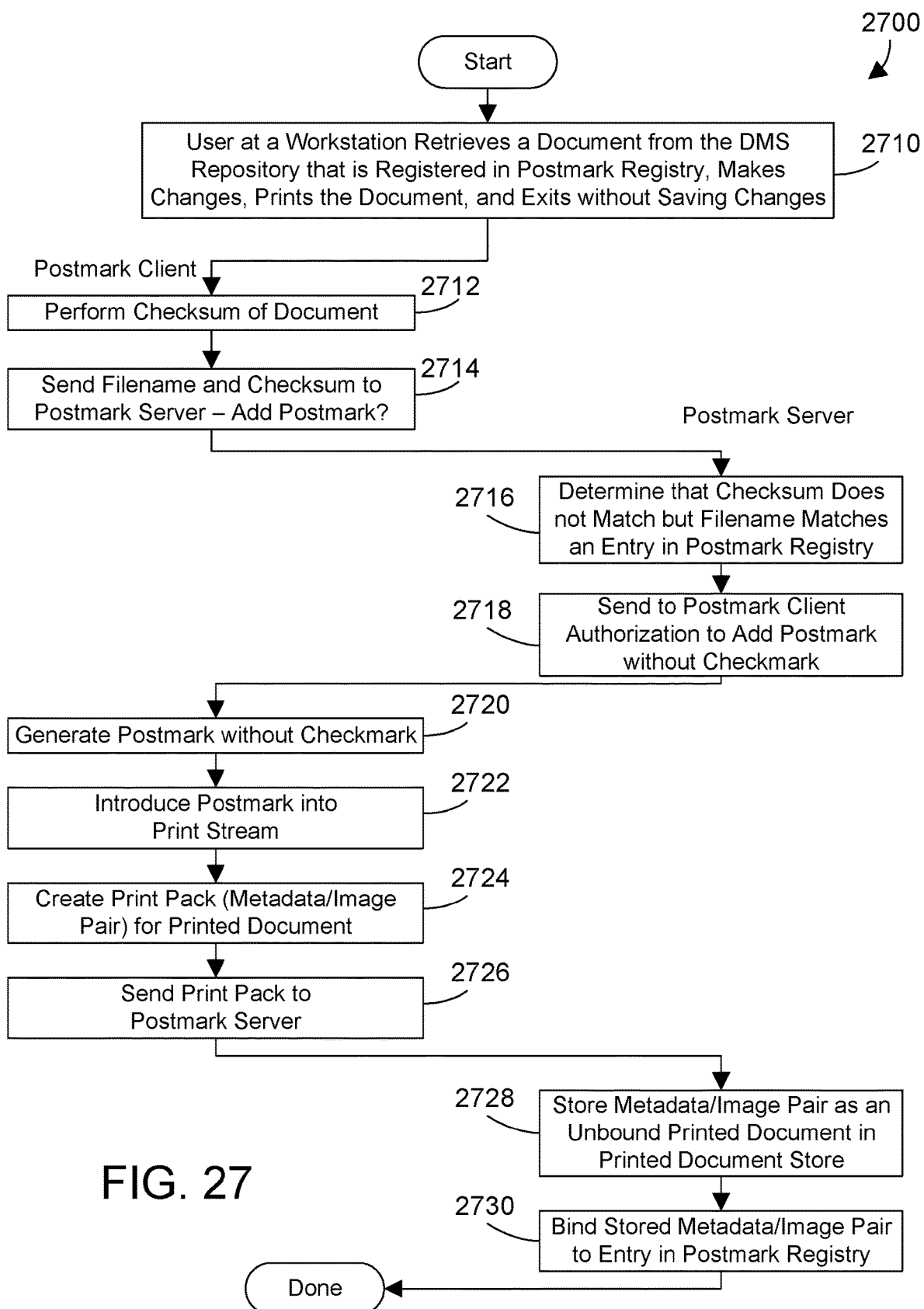
FIG. 27 is a flow diagram of a method preferably illustrating a third specific use case for the printed document manager.

A third sample use case is shown as method 2700 in FIG. 27, and is initiated when a user at a workstation retrieves a document from the DMS repository that is registered in the postmark registry, makes changes, prints the document, then exits the application on the user's workstation without saving the changes (step 2710). The postmark client detects the print event, and in response, performs a checksum of the document being printed (step 2712). The filename and checksum are sent to the postmark server to determine whether the postmark client should add a postmark to this printed document (step 2714). The postmark server receives the filename and checksum from the postmark client, and determines the checksum does not match, but the filename matches an entry in the postmark registry (step 2716). The postmark server sends authorization to the postmark client to add the postmark (step 2718), but the postmark will not have the checkmark because the printed document does not match the current document in the DMS repository, as indicated by the mismatch in checksums. The postmark client generates the postmark without the checkmark (step 2720), introduces the postmark into the print stream (step 2722), creates a print pack comprising a metadata/image pair for the printed document (step 2724), and sends the metadata/image pair to the postmark server (step 2726). The postmark server receives and processes the metadata/image pair, storing it as an unbound printed document in the printed document store (step 2728). Even though the checksum does not match, the metadata/image pair is still bound to the corresponding entry in the postmark registry based on the match in filename (step 2730). Method 2700 is then done.

Figure 28:
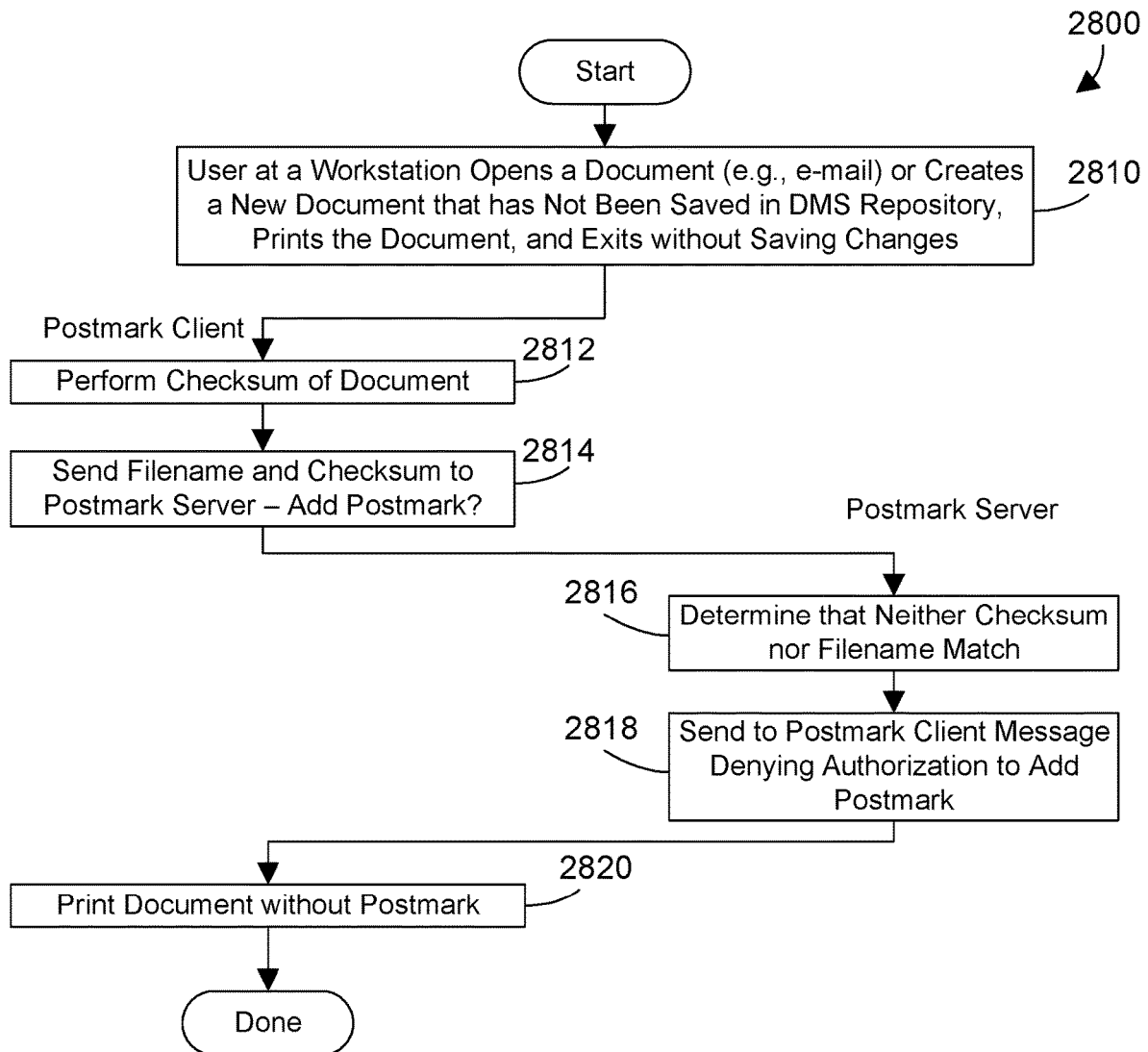
FIG. 28 is a flow diagram of a method preferably illustrating a fourth specific use case for the printed document manager.

A fourth sample use case is shown as method 2800 in FIG. 28, and is initiated when a user at a workstation opens a document or creates a new document that has not been saved in the DMS repository, prints the document, and exits without saving the changes to the DMS repository (step 2810). This could be the case, for example, when a user receives an e-mail and wants to quickly print the e-mail to take to a meeting without taking the time to store the e-mail in the DMS repository. The postmark client detects the print event, and in response, performs a checksum of the document being printed (step 2812). The filename and checksum are sent to the postmark server to determine whether the postmark client should add a postmark to this printed document (step 2814). The postmark server receives the filename and checksum from the postmark client, and determines that neither the checksum nor the filename matches any entry in the postmark registry (step 2816). As a result, the postmark server sends to the postmark client a message denying authorization to the postmark client to add the postmark (step 2818). The postmark client then prints the printed document without a postmark (step 2820). Method 2800 is then done.

Figure 29:
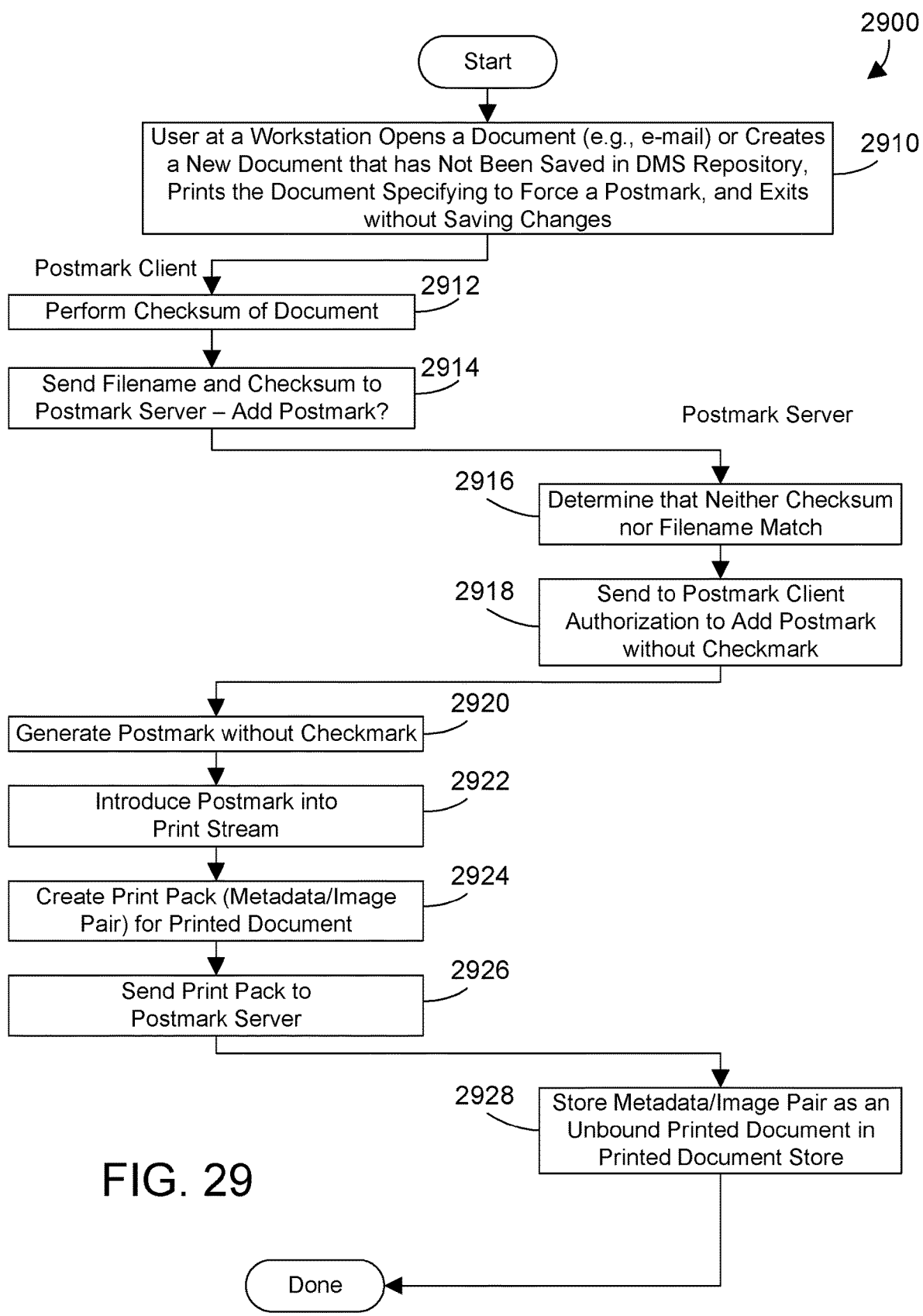
FIG. 29 is a flow diagram of a method preferably illustrating a fifth specific use case for the printed document manager.

A fifth sample use case is shown as method 2900 in FIG. 29, and is initiated when a user at a workstation opens a document or creates a new document that has not been saved in the DMS repository, prints the document while specifying to force a postmark, and exits the application without saving the changes to the DMS repository (step 2910). The postmark client detects the print event, and in response, performs a checksum of the document being printed (step 2912). The filename and checksum are sent to the postmark server to determine whether the postmark client should add a postmark to this printed document (step 2914). The postmark server receives the filename and checksum from the postmark client, and determines neither the checksum nor filename match (step 2916), but sends authorization to the postmark client to add the postmark without a checkmark (step 2918) due to the user specifying to force a postmark. The postmark client generates the postmark without the checkmark (step 2920), introduces the postmark into the print stream (step 2922), creates a print pack comprising a metadata/image pair for the printed document (step 2924), and sends the metadata/image pair to the postmark server (step 2926). The postmark server receives and processes the metadata/image pair, storing it as an unbound printed document in the printed document store (step 2928). Method 2900 is then done. Because the user forced the postmark on a document that is not in the DMS repository in step 2910, there will never be a document in the DMS repository, and hence an entry in the postmark registry, that matches the unbound printed document, so the document will remain an unbound printed document. In other words, the printed document binding process will never be successful in binding the metadata/image pair to a corresponding entry in the postmark registry, so it will be retained as an unbound printed document in the printed document store until the unbound printed document no longer satisfies the unbound document retention policy, at which time the printed document retention and purge tool will purge or delete the unbound printed document from the printed document store. A user might force a postmark to signal to his or her colleagues they may discard the document after use.

As discussed above, a first mode of operation for the printed document manager was discussed above with reference to FIGS. 3-29. In a first mode of operation, documents in a DMS are pre-registered in the postmark registry, and when the postmark server needs to determine whether or not to authorize a postmark for a document, the postmark server queries the postmark registry to see if the document being printed is in the postmark registry. In a second mode of operation that is also within the scope of the disclosure and claims herein, no documents are pre-registered in the postmark registry. Instead, one or more DMSs are registered in the postmark registry, and when the postmark server needs to determine whether or not to authorize a postmark for a document, the postmark server queries one or more of the registered DMSs to see if the document being printed is in a registered DMS. The second mode of operation is discussed below with reference to FIGS. 30-38.

Figure 30:
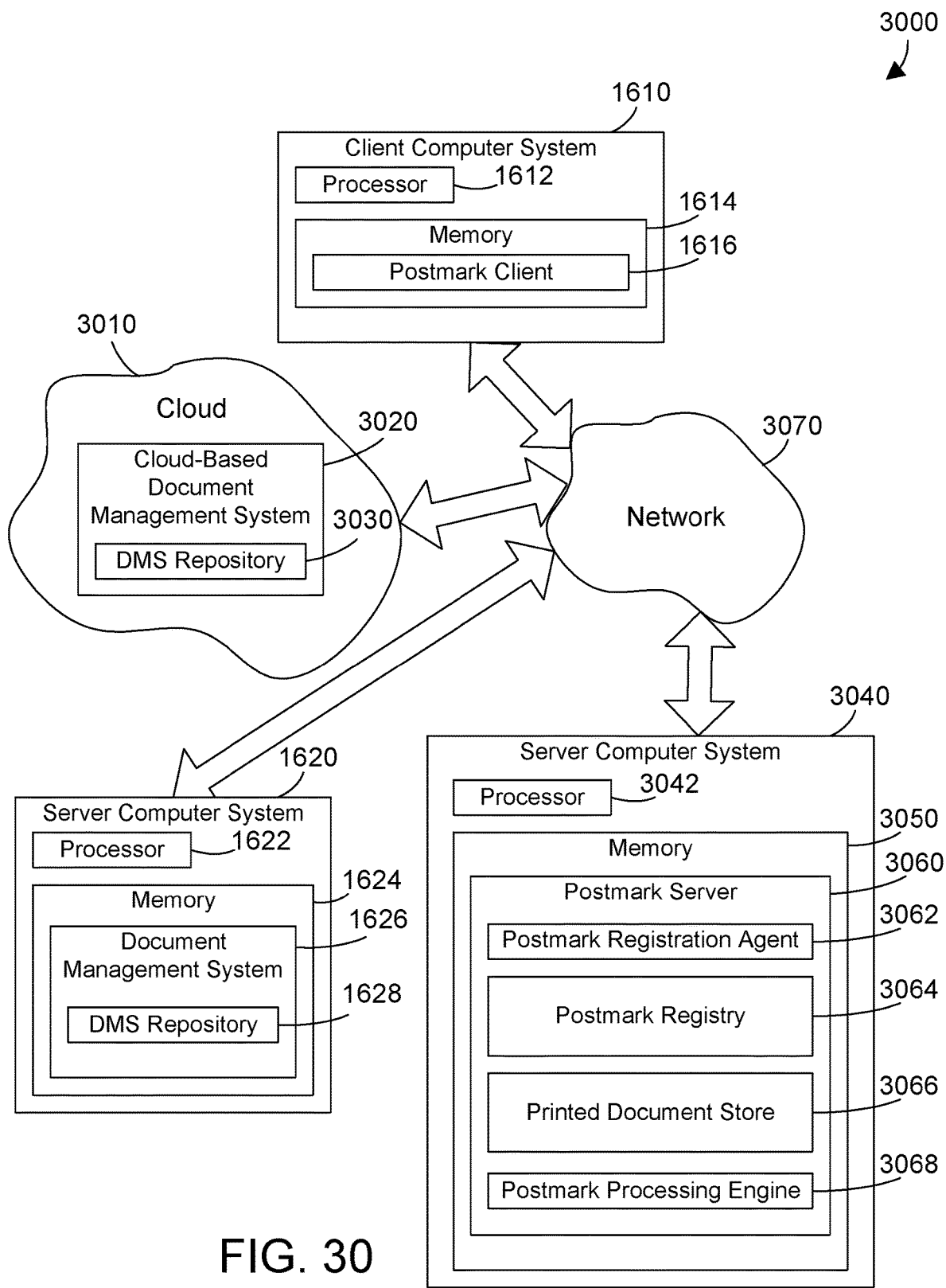
FIG. 30 is a block diagram showing a second suitable implementation for the printed document manager that interacts with one or more cloud-based DMSs.

The configuration shown in FIG. 16 shows a DMS 1626 on a server computer system 1620 that is accessible via network 1640 to the server computer system 1630. Referring to FIG. 30, a printed document manager system 3000 includes the same client computer system 1610 with its associated processor 1612, memory 1614, and postmark client 1616 and the same server computer system 1620 with its processor 1622, memory 1624, DMS 1626, and DMS repository 1628. The client computer system 1610, server computer system 1620, and server computer system 3040 are connected to a network 3070, which could be any suitable combination of network devices and types, including local area networks, wide area networks, virtual networks, virtual private networks, the Internet, etc. Network 3070 is connected to a cloud 3010, which includes a cloud-based document management system 3020 that manages documents in a cloud-based DMS repository 3030. The server computer system 3040 preferably includes a processor 3042 and memory 3050 that includes a postmark server 3060, a postmark registration agent 3062, a postmark registry 3064, a printed document store 3066, and a postmark processing engine 3068, which are specific examples of the postmark server 220, the postmark registration agent 2302, the postmark registry 236, the printed document store 127, and the postmark processing engine 240, respectively, shown in FIG. 2. The postmark registration agent 3062 functions in a different manner in the system shown in FIG. 30, when compared to the postmark registration agent 1644 shown in FIG. 16. Postmark registration agent 1644 in FIG. 16 pre-registers documents, as shown in method 300 in FIG. 3. This approach works well with relatively small DMS repositories at a single location. However, many large companies have DMS repositories over many different locations that can contain millions of documents. Pre-registering all of these documents at all of these locations takes considerable time and system resources. Pre-registering may not be needed for many of those documents that are towards the end of their lifecycle, and won't likely be printed again. As a result, the approach for the second mode of operation changes what is registered. The postmark registration agent 3062, instead of pre-registering documents in DMS repositories, instead registers the repositories themselves. The postmark registration agent 3062 could thus locate a DMS, such as DMS 1646 or cloud-based DMS 3020, and register these DMSs to be used by the postmark server 3060 by the postmark registration agent 3062 writing the DMSs and their corresponding access information to the postmark registry 3064. Once a DMS is registered with the postmark server 3060, the postmark server can perform its functions as described in more detail below. The printed document store 3066 and postmark processing engine 3068 are preferably similar to the printed document store 127 and postmark processing engine 240 in FIG. 16 and described above.

Figure 31:
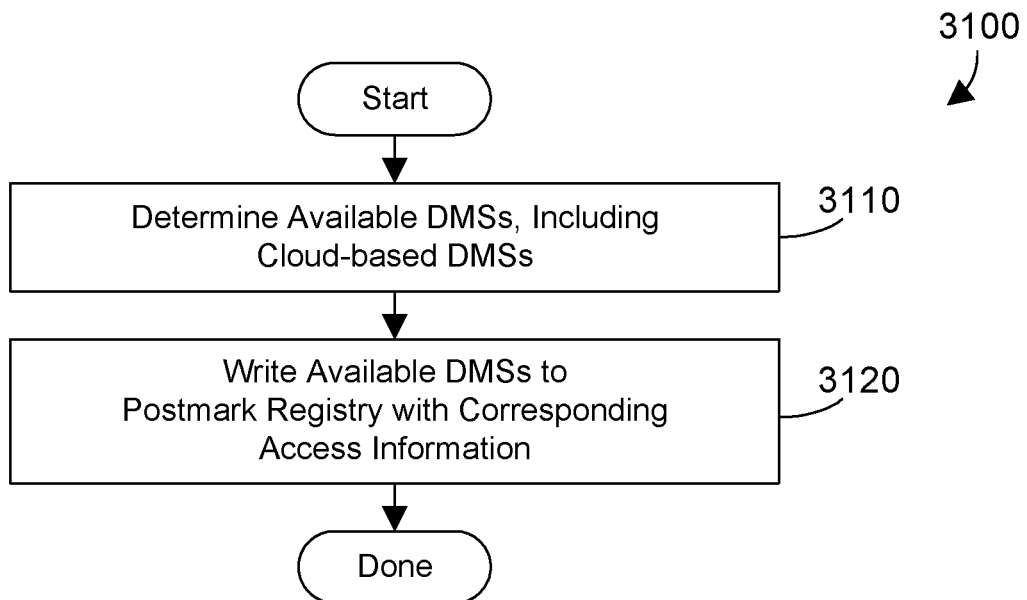
FIG. 31 is a flow diagram of a method for registering cloud-based DMSs with the printed document manager.

Referring to FIG. 31, a method 3100 is preferably performed by the postmark registration agent 3062 in FIG. 30.

The available DMSs, including cloud-based DMSs, are determined (step 3110). The available DMSs are written to the postmark registry with corresponding access information (step 3120). The corresponding access information can include any suitable information needed to access the cloud-based DMS, including without limitation a link, username, password, web service, API, folder on the client computer system 1610, etc. By registering DMSs with the postmark server by writing the needed information to the postmark registry, the postmark server knows it can query the DMSs as needed, as described in more detail below.

Figure 32:
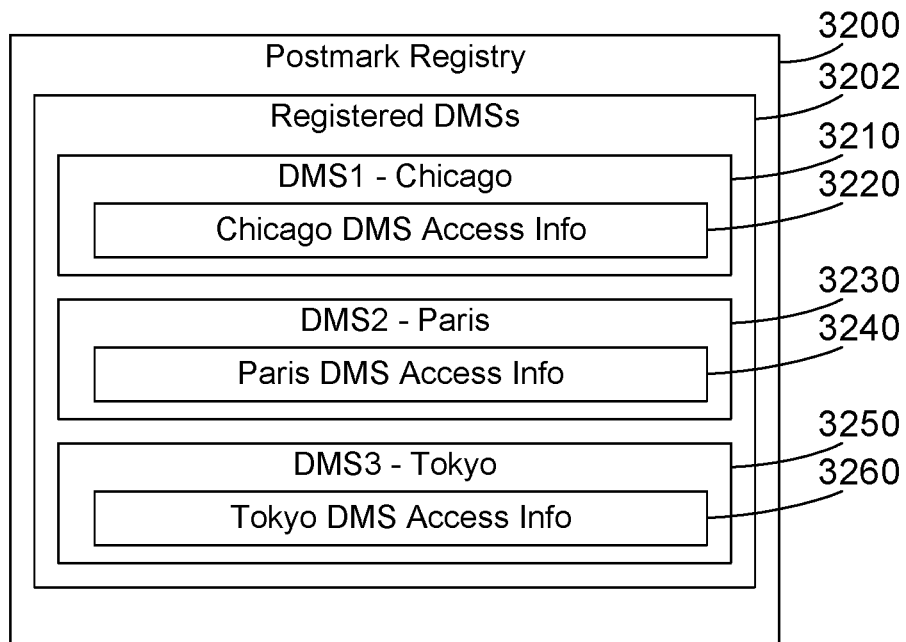
FIG. 32 is a block diagram of one suitable example of the postmark registry shown in FIG. 30.

The postmark registry 3064 in FIG. 30 preferably includes all DMSs registered with the postmark server. An example of a specific postmark registry 3200 is shown in FIG. 32, which is a specific example of postmark registry 3064 in FIG. 30, and includes registered DMSs 3202. The registered DMSs 3202 for the specific example in FIG. 32 include a DMS in Chicago 3210, a DMS in Paris 3230, and a DMS in Tokyo 3250. Each entry in the postmark registry includes not only the DMS, but access information needed for the postmark server to access the DMS. Thus, the Chicago DMS 3210 has corresponding access information 3220; the Paris DMS 3230 has corresponding access information 3240; and the Tokyo DMS 3250 has corresponding access information 3260. The entries in the DMS provide the information needed by the Postmark Server to know how to access the DMSs. We assume for the example in FIG. 32 all three DMSs 3210, 3230 and 3250 are cloud-based DMSs. However, a system could include DMSs that are not cloud-based as well.

Figure 33:
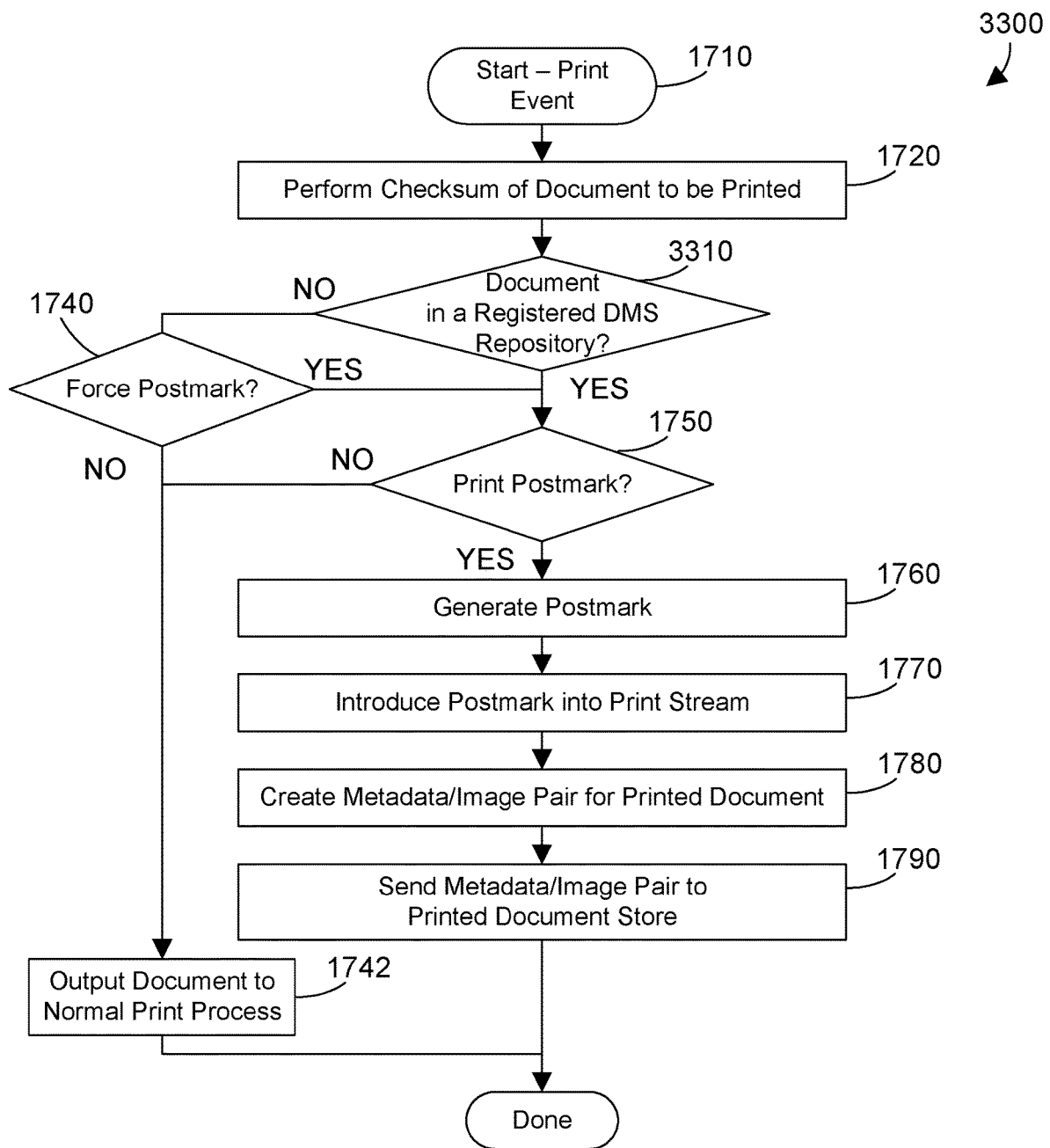
FIG. 33 is a flow diagram of a method that is preferably performed by printed document manager.

Referring to FIG. 33, a method 3300 is similar in some ways to the method 1700 shown in FIG. 17. Note that all the steps have the same reference designators as shown in FIG. 17 except for step 3310 in FIG. 33, which has replaced step 1730 in FIG. 17. As discussed above, in the configuration shown in FIG. 30, the postmark registration agent 3062 does not pre-register documents. Instead, step 3310 in FIG. 33 determines whether a document is in a registered DMS repository. In some implementations, the determination of whether the document is in a registered DMS repository can be made based on the filename alone, because filenames in DMSs typically include a full path and version information for the document. In addition, the full path typically identifies the DMS repository where the document is stored. A simple example will illustrate. Let's assume a user retrieves a document from the Paris DMS 3230 shown in FIG. 32, makes some changes to the document, saves the document, then prints the document. The print event starts method 3300 in FIG. 33 at step 1710. A checksum of the document to be printed is performed (step 1720). We assume the filename of the document includes a designation for the Paris DMS, and we assume the Paris DMS is a registered DMS, as shown at 3230 in FIG. 32, so a query is sent to the Paris DMS using the Paris DMS access info 3240 to determine whether the filename is in the Paris DMS repository. In the example given above, the user saved the changes to the document, so the filename of the document will match the filename in the Paris DMS (step 3310=YES). Method 3300 then continues with the remaining steps, as discussed in detail above with reference to FIG. 17. A primary difference between method 1700 in FIG. 17 and method 3300 in FIG. 33 is instead of querying the postmark registry to determine if a document is registered in step 1730 in FIG. 17, the appropriate DMS is queried in step 3310 of FIG. 33 to determine whether the document exists in a registered DMS repository.

Figure 34:
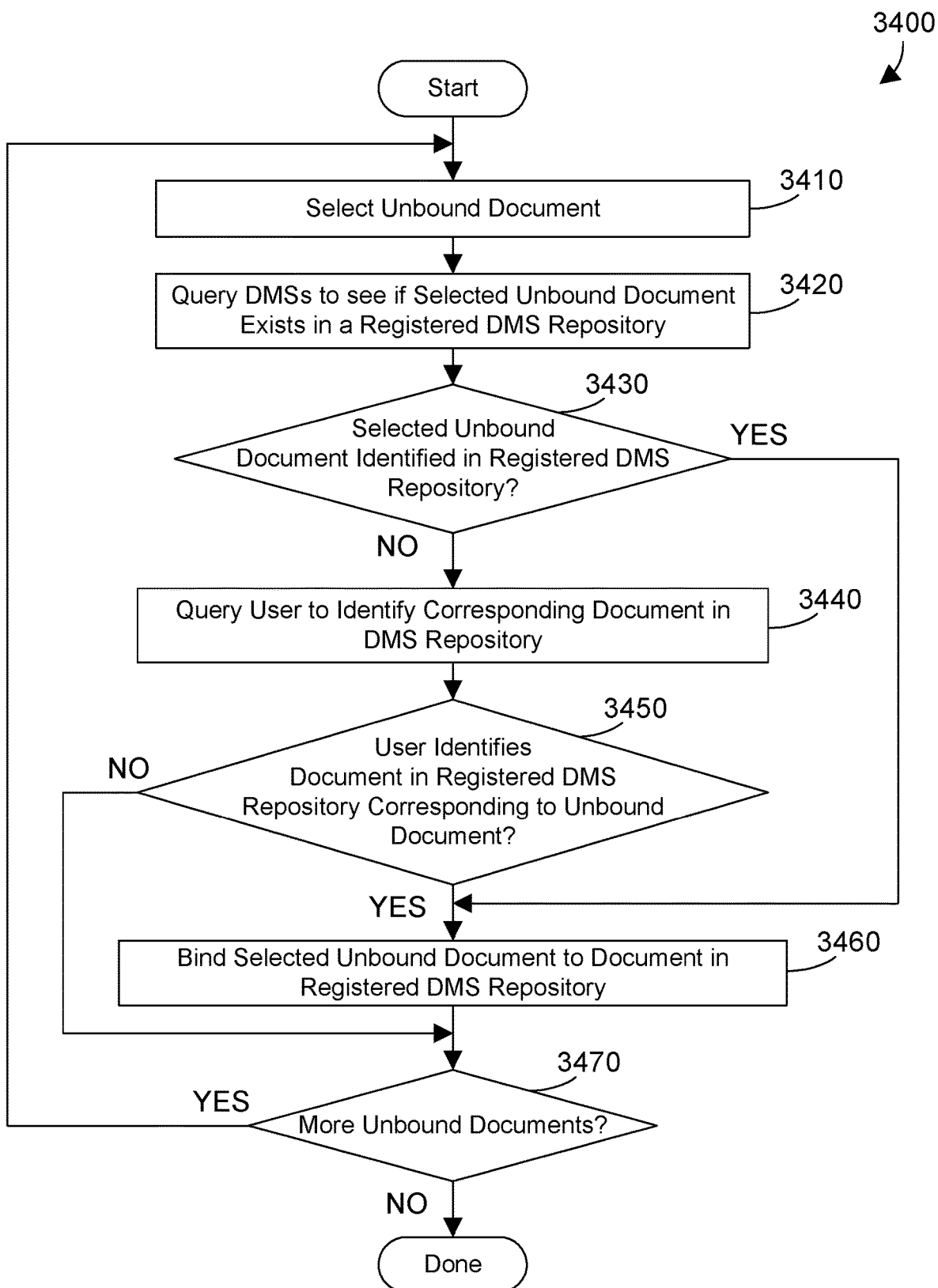
FIG. 34 is a flow diagram of a method for binding unbound documents.

With the configuration shown in FIG. 30, what constitutes an unbound document also changes. In the first implementation described above with reference to FIGS. 3-29, a printed document is unbound when the printed document does not correspond to any document in the postmark registry 126. In the implementation in FIG. 30 where registered DMSs are queried, a document is unbound when the printed document does not correspond to any document in any registered DMS repository. When a document is printed with a postmark but the document does not exist in any registered DMS repository, the document is an unbound document. This could happen, for example, when a person opens an e-mail attachment and prints the e-mail attachment without first saving the e-mail attachment to a registered DMS repository, and specifies to force a postmark because the user knows this file will be stored eventually in a registered DMS repository. Let's assume for this example the user leaves the document open on the user's workstation for a few days, then finally stores the file in the registered DMS repository. A method 3400 shown in FIG. 34 is most preferably run on a periodic basis, such as once a week, in an attempt to bind unbound documents. An unbound document is selected (step 3410). The registered DMSs are queried to see if the selected unbound document exists in a registered DMS repository (step 3420). When the selected unbound document has a corresponding document that can be identified in a registered DMS repository (step 3430=YES), the selected unbound document is bound to the corresponding document in the registered DMS repository (step 3460). The matching of the selected unbound document to a corresponding document in the DMS in step 3430 can be done by looking not only at filenames, but by using other data corresponding to the selected unbound document as well, such as metadata, a checksum, etc. When a document in a registered DMS repository cannot be automatically identified (step 3430=YES), the user can be queried to identify a corresponding document in the DMS repository for the selected unbound document (step 3440). When the user identifies a document in a registered DMS repository corresponding to the selected unbound document (step 3450=YES), the selected unbound document is bound to the corresponding document in the DMS repository (step 3460). When the user does not identify a document in a registered DMS repository corresponding to the selected unbound document (step 3450=NO), step 3460 is skipped. When there are more unbound documents to process (step 3470=YES), method 3400 loops back to step 3410 and continues. When there are no more unbound documents to process (step 3470=NO), method 3400 is done.

Method 3400 could vary from the steps shown in FIG. 34 within the scope of the disclosure and claims herein. For example, the attempt to automatically match files in a registered DMS to a selected unbound document in step 3430 could be performed in one process, and a separate process could query the user and receive input from the user in step 3440 and 3450. Instead of being queried for each selected unbound document in step 3440, the user could be presented with a list of all unbound documents the user has printed, and the user could then go through the list and identify any corresponding documents in a registered DMS for each of the unbound documents in the list. These and other variations are within the scope of the disclosure and claims herein.

Figure 35:
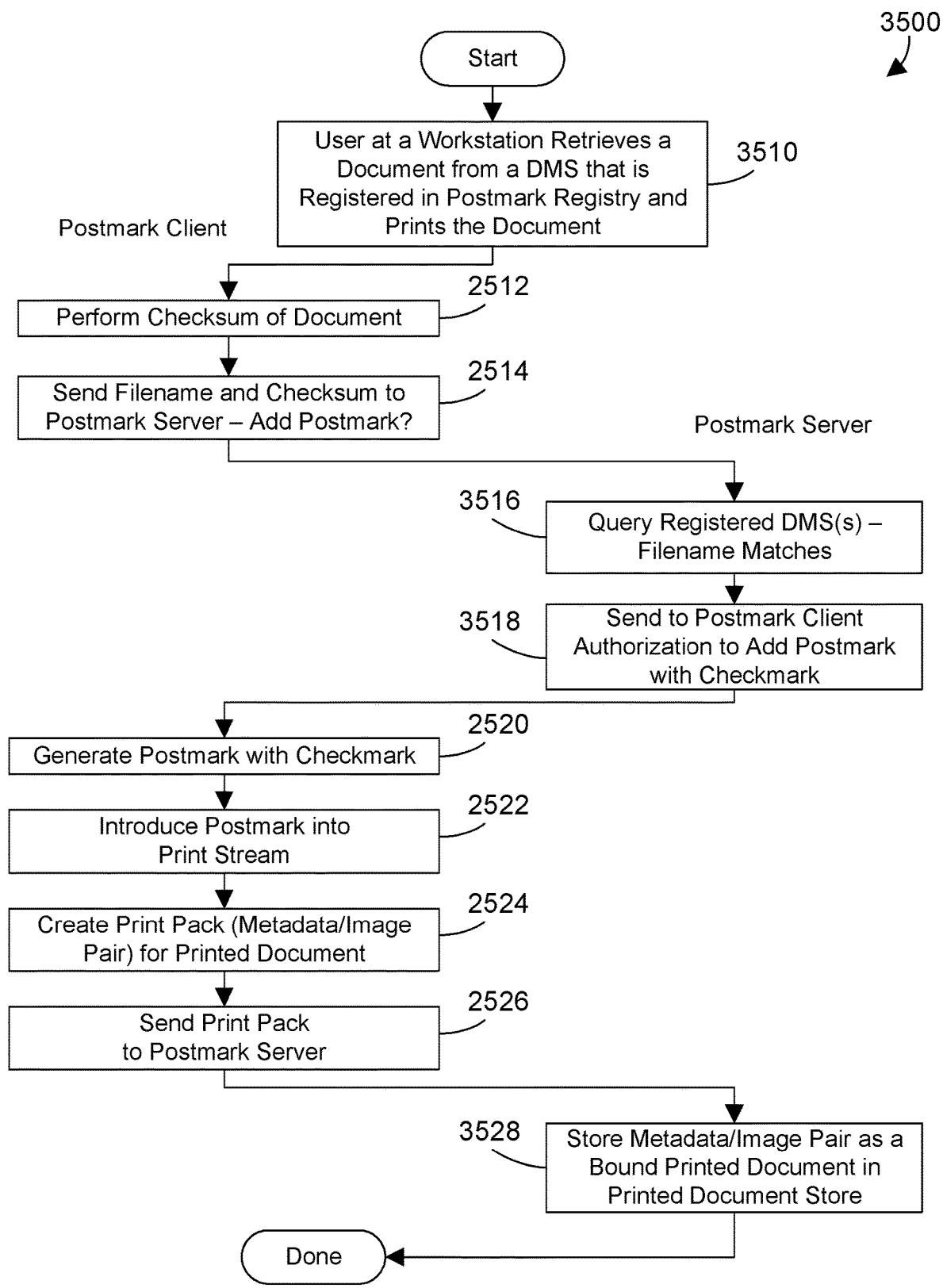
FIG. 35 is a flow diagram of a method preferably illustrating a sixth specific use case for the printed document manager when using cloud-based DMSs.

Four sample use cases are shown in FIGS. 35-38 for the configuration in FIG. 30 that does not pre-register documents and that queries DMSs to see if the document exists in a registered DMS repository. Referring to FIG. 35, we assume for a use case 3500 a user at a workstation retrieves a document from a DMS that is registered in the postmark registration and prints the document (step 3510). The postmark client performs a checksum of the document (step 2512). The postmark client then sends the filename and checksum to the postmark server with a query regarding whether or not to add a postmark to the print event for this document (step 2514). The postmark server receives the query from the postmark client, and in response, queries one or more registered DMSs to see if the filename matches any file in the repositories of the registered DMSs (step 3516). Because the document was retrieved from a registered DMS and printed in step 3510, when the postmark server queries the DMS in step 3516, the DMS will report that the filename matches a file in its repository. In response, the postmark server sends to the postmark client authorization add the postmark with a checkmark (step 3518). The postmark client then generates the postmark with a checkmark (step 2520), introduces the postmark into the print stream (step 2522), creates the print pack (step 2524, and sends the print pack to the postmark server (step 2526). The metadata image pair is then stored as a bound printed document in the printed document store (step 3528). Note step 3528 stores the metadata/image pair as a bound printed document because the corresponding document in the registered DMS was already identified in response to the query in step 3516. Method 3500 is then done.

Figure 36:
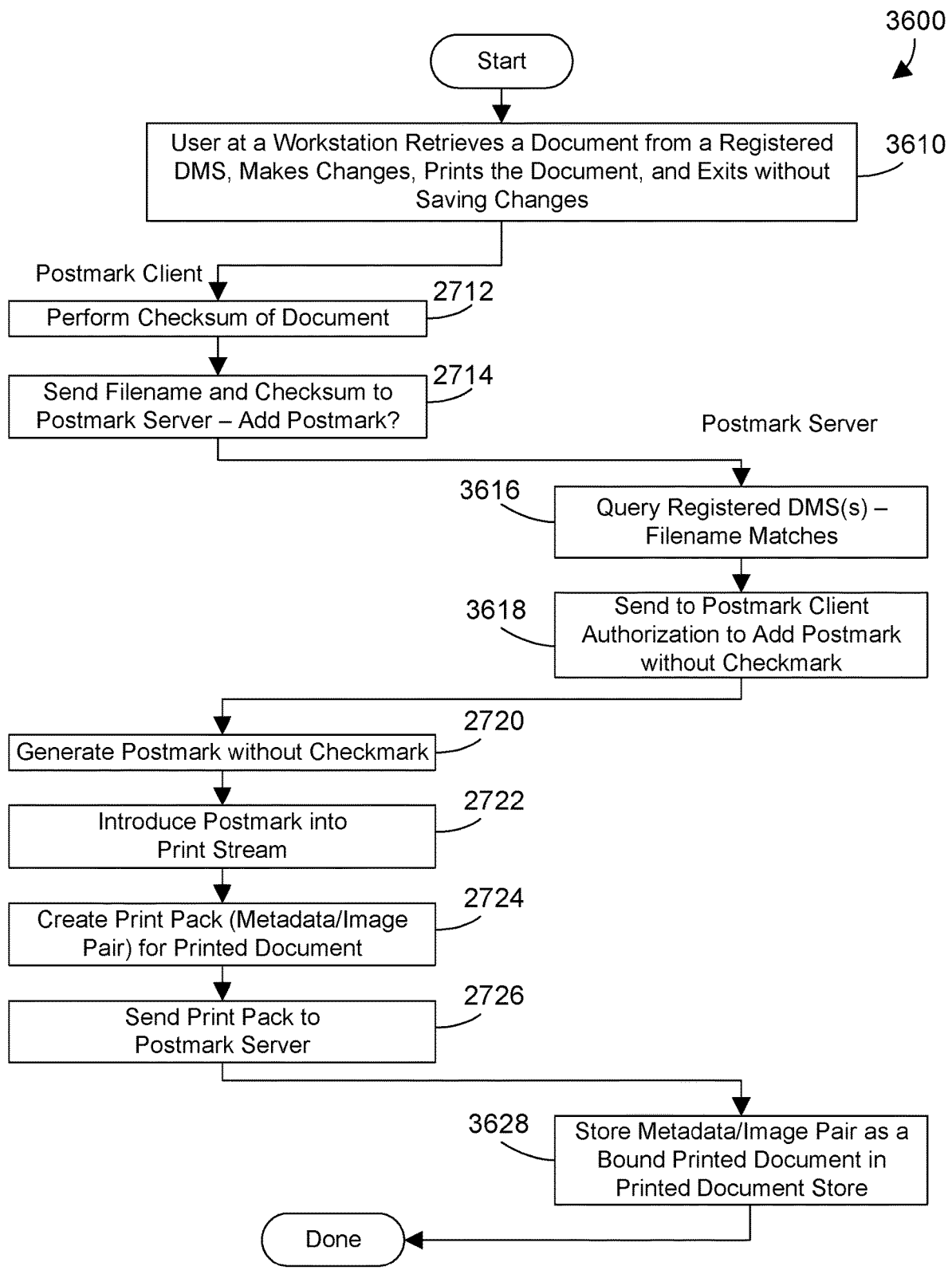
FIG. 36 is a flow diagram of a method preferably illustrating a seventh specific use case for the printed document manager when using cloud-based DMSs.

Referring to FIG. 36, in another use case 3600 we assume a user at a workstation retrieves a document from a registered DMS, makes changes, prints the document, and exits without saving the changes (step 3610). In response, the postmark client performs a checksum of the document (step 2712) and sends the filename and checksum to the postmark server with a query regarding whether or not to add a postmark to the print event for this document (step 2714). The postmark server receives the query from the postmark client, and in response, queries one or more registered DMSs to see if the filename matches any file in the repositories of the registered DMSs (step 3616). Because the document was retrieved from a registered DMS and printed in step 3510, when the postmark server queries the DMS in step 3516, the DMS will report that the filename matches a file in its repository. In response, the postmark server sends to the postmark client authorization add the postmark without a checkmark (step 3618). The postmark client then generates the postmark without a checkmark (step 2720), introduces the postmark into the print stream (step 2722), creates the print pack (step 2724, and sends the print pack to the postmark server (step 2726). The metadata image pair is then stored as a bound printed document in the printed document store (step 3628). Method 3600 is then done.

Figure 37:
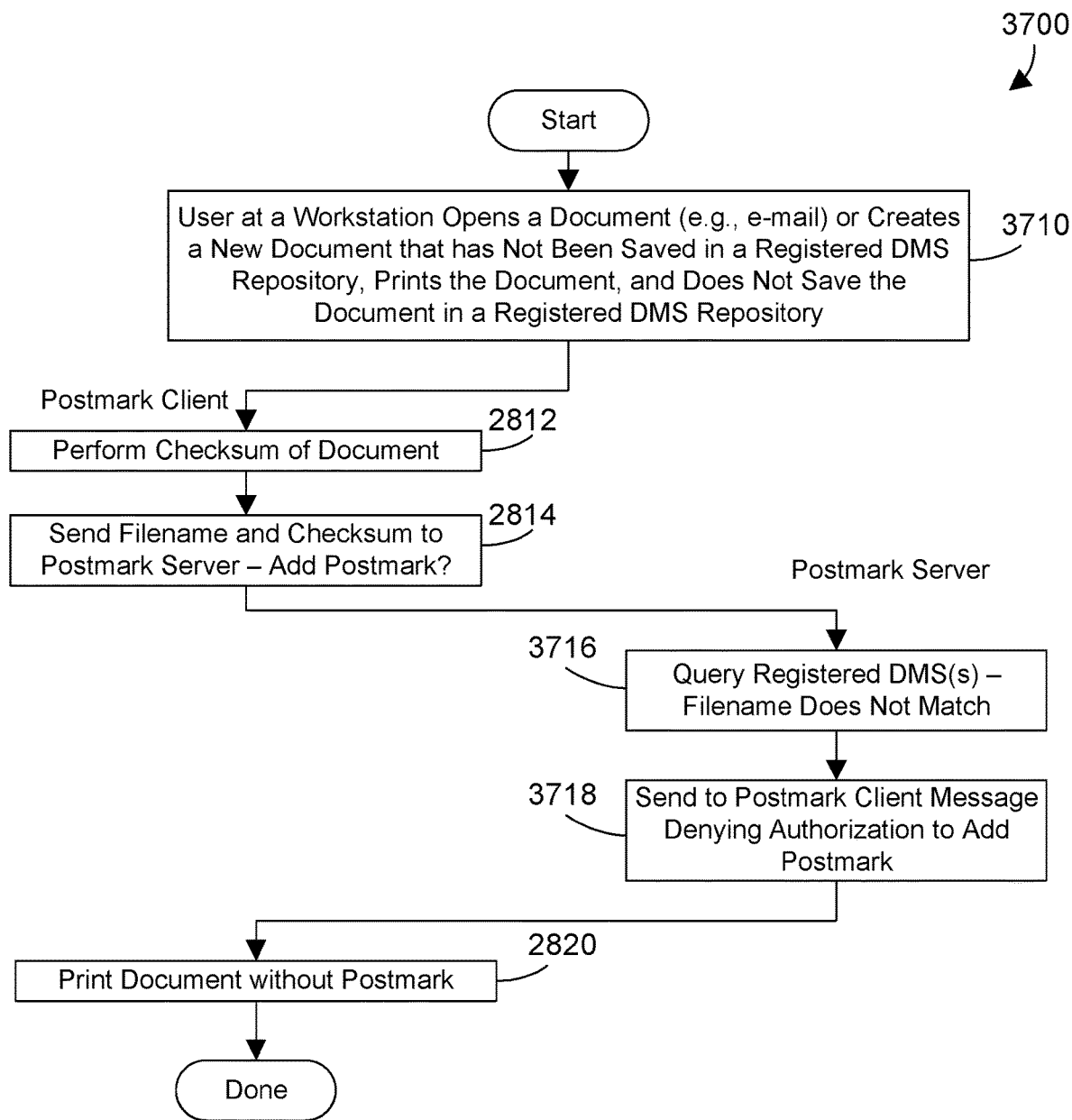
FIG. 37 is a flow diagram of a method preferably illustrating an eighth specific use case for the printed document manager when using cloud-based DMSs.

Referring to FIG. 37, in another use case 3700 we assume a user at a workstation opens a document or creates a new document that has not been saved in a registered DMS repository, prints the document, and does not save the document to a registered DMS repository (step 3710). The postmark client performs a checksum of the document (step 2812), and sends the filename and checksum to the postmark server with a query regarding whether or not to add a postmark to the print event for this document (step 2814). The postmark server receives the query from the postmark client, and in response, queries one or more registered DMSs to see if the filename matches any file in the repositories of the registered DMSs (step 3716). In this case, the document does not exist in the repository of any registered DMS, so the queries to the one or more registered DMSs in step 3716 return results that indicate the document does not exist. In response, the postmark server sends to the postmark client a message denying authorization to add the postmark (step 3718). The postmark client then prints the document without the postmark (step 2820).

Figure 38:
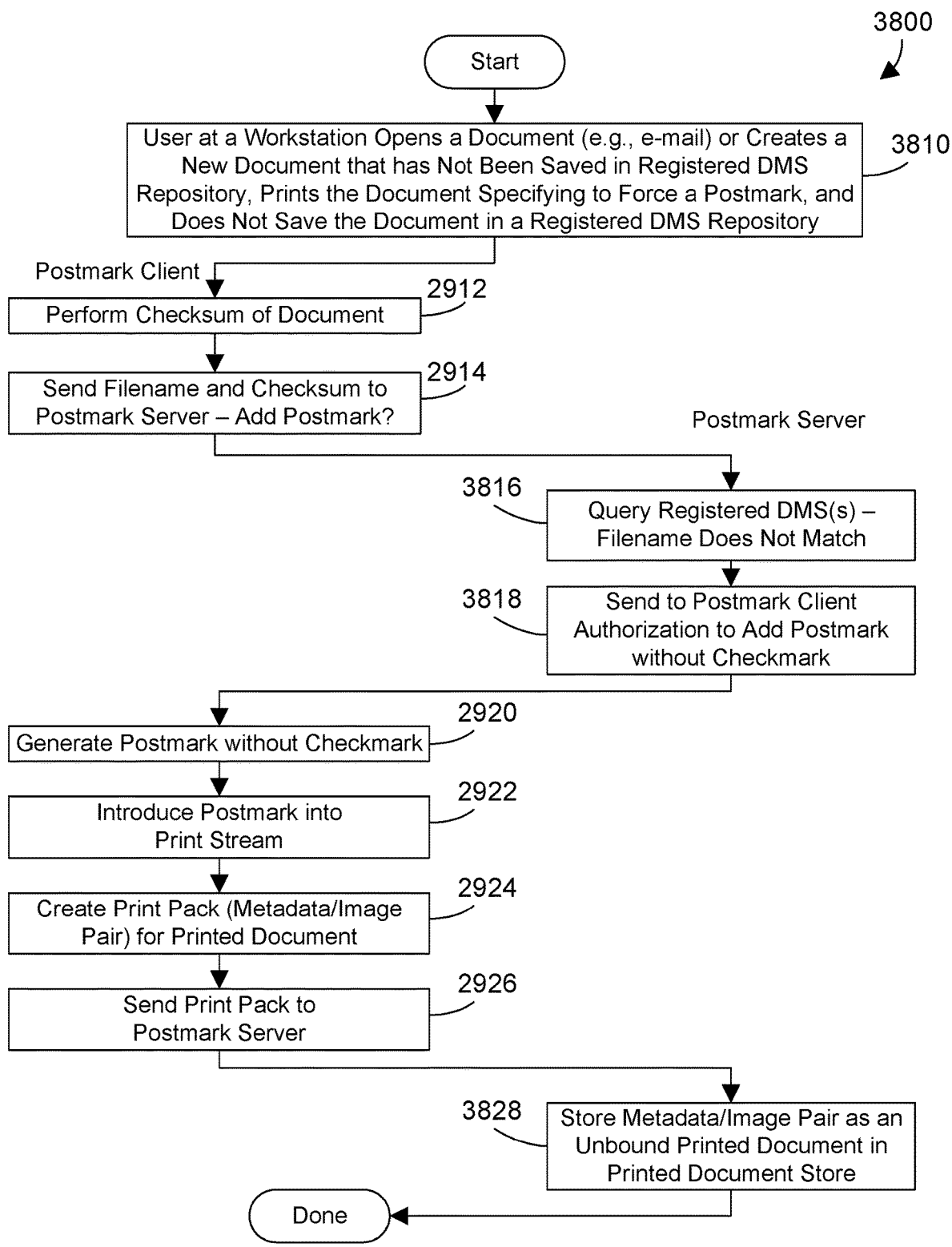
FIG. 38 is a flow diagram of a method preferably illustrating a ninth specific use case for the printed document manager when using cloud-based DMSs.

Referring to FIG. 38, in another use case 3800 we assume a user at a workstation opens a document or creates a new document that has not been saved in a repository for any registered DMS, prints the document specifying to force a postmark, and does not save the document to a registered DMS repository (step 3810). In response, the postmark client performs a checksum of the document (step 2912) and sends the filename and checksum to the postmark server with a query regarding whether or not to add a postmark to the print event for this document (step 2914). The postmark server receives the query from the postmark client, and in response, queries one or more registered DMSs to see if the filename matches any file in the repositories of the registered DMSs (step 3816). Because the file does not exist in any repository of any registered DMS, the queries to the DMSs will indicate no match for the file. But because the user specified to force a postmark in step 3810, the postmark server sends to the postmark client authorization to add the postmark without a checkmark (step 3818). The postmark client then generates the postmark without a checkmark (step 2920), introduces the postmark into the print stream (step 2922), creates the print pack (step 2924), and sends the print pack to the postmark server (step 2926). In response, the postmark server stores the metadata/image pair as an unbound document in the printed document store (step 3828).

The figures and specification discussed above support an apparatus comprising: at least one processor; a memory coupled to the at least one processor; a network connection coupled to the at least one processor, the network connection coupling the apparatus to at least one cloud-based document management system (DMS); a printed document manager residing in the memory and executed by the at least one processor, the printed document manager comprising: a postmark server that communicates with a postmark client executing on a client computing device, wherein the postmark client detects a print event for a specified document on the client computing device, and in response, queries the postmark server to determine whether the print event for the specified document should include a graphical postmark; the postmark server, in response to receiving the query from the postmark client, queries the at least one cloud-based DMS to determine whether the specified document matches a document in the at least one cloud-based DMS; and when the specified document matches a document in the at least one cloud-based DMS, the postmark server authorizes the postmark client to add the graphical postmark in a print stream corresponding to the print event for the specified document.

The figures and specification discussed above additionally support a method for managing printed documents comprising: providing a postmark client executing on a client computing device; providing a postmark server that communicates with the postmark client and communicates with at least one cloud-based document management system (DMS); the postmark client detecting a print event for a specified document on the client computing device, and in response, queries the postmark server to determine whether the print event for the specified document should include a graphical postmark; the postmark server, in response to receiving the query from the postmark client, queries the at least one cloud-based DMS to determine whether the specified document matches a document in the at least one cloud-based DMS; and when the specified document matches a document in the at least one cloud-based DMS, the postmark server authorizes the postmark client to add the graphical postmark in a print stream corresponding to the print event for the specified document.

The figures and specification discussed above further support a networked computer system comprising: a cloud-based computer system comprising: a cloud-based document management system that manages a plurality of documents stored in a cloud-based repository; a client computer system comprising: a first processor; a first memory; a postmark agent residing in the first memory and executed by the first processor, wherein the postmark agent detects a print event for a document by a first software application executing on the client computer system; a server computer system comprising: a second processor; a second memory; a postmark server residing in the second memory and executed by the second processor; wherein the postmark client, in response to detecting the print event for the document on the client computer system, queries the postmark server to determine whether to generate a graphical postmark for the print event for the document; the postmark server, in response to receiving the query from the postmark client, queries the cloud-based document management system to determine whether the specified document matches a document in the cloud-based repository; and when the specified document matches a document in the cloud-based repository, the postmark server authorizes the postmark client to add the graphical postmark in a print stream corresponding to the print event for the specified document.

The printed document manager described herein provides significant benefits over known methods for marking printed paper, such as using footers on word processing documents as referenced above. A footer printed on a word processing document does not provide a checksum match to the word processing document, so if the document is edited and not saved and then printed, the stored electronic version marked by the footer does not match the printed version, even though the same version number is in the footer. In addition, footers on word processing documents are intended to track versions of documents, not to confirm that an in-hand paper document matches a document stored electronically in the DMS repository. Furthermore, footers require user intervention to apply conventions, but the applying a postmark as described herein is automatic and does not require any intervention on the part of the user. For these and many other reasons, applying a postmark to printed documents as described herein is a significant improvement to printing footers on word processing documents.

The disclosure and claims herein support an apparatus comprising: at least one processor; a memory coupled to the at least one processor; a printed document manager residing in the memory and executed by the at least one processor, the printed document manager comprising: a postmark server that communicates with a postmark client executing on a client computing device, wherein the postmark client detects a print event for a specified document on the client computing device, and in response, queries the postmark server to determine whether the print event for the specified document should include a graphical postmark; the postmark server, in response to receiving the query from the postmark client, queries at least one document management system to determine whether the specified document matches a document in the at least one document management system; and when the specified document matches a document in the at least one document management system, the postmark server authorizes the postmark client to add the graphical postmark in a print stream corresponding to the print event for the specified document.

The disclosure and claims herein further support a method for managing printed documents comprising: providing a postmark client executing on a client computing device; providing a postmark server that communicates with the postmark client and communicates with at least one document management system; the postmark client detecting a print event for a specified document on the client computing device, and in response, queries the postmark server to determine whether the print event for the specified document should include a graphical postmark; the postmark server, in response to receiving the query from the postmark client, queries the at least one document management system to determine whether the specified document matches a document in the at least one document management system; and when the specified document matches a document in the at least one document management system, the postmark server authorizes the postmark client to add the graphical postmark in a print stream corresponding to the print event for the specified document.

The disclosure and claims herein additionally support a networked computer system comprising: (A) a cloud-based computer system comprising: a cloud-based document management system that manages a plurality of documents stored in a cloud-based repository; (B) a client computer system comprising: a first processor; a first memory; a postmark agent residing in the first memory and executed by the first processor, wherein the postmark agent detects a print event for a document by a first software application executing on the client computer system; (C) a server computer system comprising: a second processor; a second memory; and a postmark server residing in the second memory and executed by the second processor; wherein the postmark client, in response to detecting the print event for the document on the client computer system, queries the postmark server to determine whether to generate a graphical postmark for the print event for the document; the postmark server, in response to receiving the query from the postmark client, queries the cloud-based document management system to determine whether the specified document matches a document in the cloud-based repository; and when the specified document matches a document in the cloud-based document management system, the postmark server authorizes the postmark client to add the graphical postmark in a print stream corresponding to the print event for the specified document.

A printed document manager manages printed documents and is separate from Document Management Systems (DMSs) that manage electronic soft copy documents. One or more DMSs are registered with a postmark server. A client computing device executes a postmark client, detects a print event for a specified document, and queries a postmark server to determine whether the print event for the specified document should include a graphical postmark. In response, the postmark server queries one or more of the registered DMSs to determine whether the specified document matches a document in any of the repositories of the registered DMS(s). When the specified document to be printed matches a document in a registered DMS, the postmark server authorizes the postmark client to add the graphical postmark in a print stream corresponding to the print event for the specified document. When the specified document to be printed does not match any document in any registered DMS, the postmark server instructs the postmark client not to add the graphical postmark in the print stream corresponding to the print event for the specified document.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a postmark server that communicates with a postmark client executing on a client computing device, wherein the postmark client detects a print event that produces a printed document for a specified document on the client computing device, and in response, queries the postmark server to determine whether the printed document for the specified document should include a graphical postmark;
   the postmark server, in response to receiving the query from the postmark client, queries at least one document management system to determine whether the specified document matches a document in the at least one document management system; and
   when the specified document matches a document in the at least one document management system, the postmark server authorizes the postmark client to add the graphical postmark to the printed document, and in response, the postmark client receives a first print stream that does not includes the graphical postmark and adds the graphical postmark to the first print stream to generate a second print stream that includes the graphical postmark, wherein the printed document is printed from the second print stream that includes the graphical postmark.

2. The apparatus of claim 1 wherein, when the specified document does not match a document in the at least one document management system, the postmark server does not authorize the postmark client to add the graphical postmark to the first print stream.

3. The apparatus of claim 1 wherein the at least one document management system comprises at least one cloud-based document management system.

4. The apparatus of claim 1 wherein the printed document manager further comprises:
   a postmark registry that includes a plurality of entries that each corresponds to one of the at least one document management systems and that each includes corresponding access information for the one document management system.

5. The apparatus of claim 1 wherein the printed document manager further comprises;
   a printed document store that comprises:
     a first plurality of printed documents that each corresponds to one of the plurality of documents stored in the at least one document management system;
     a second plurality of printed documents that each do not correspond to any document stored in the at least one document management system; and
     for each of the first and second plurality of printed documents, corresponding print metadata that uniquely describes a print event.

6. The apparatus of claim 5 wherein the postmark client generates a print pack comprising print metadata corresponding to the print event and an image for the specified document, and sends the print pack to the postmark server.

7. The apparatus of claim 6 wherein the postmark server, upon receipt of the print pack from the postmark client, processes the print pack and stores the print metadata and the image for the specified document in an entry in the printed document store.

8. The apparatus of claim 5 wherein the printed document manager further comprises a printed document retention and purge tool that determines when to retain and purge documents in the printed document store.

9. The apparatus of claim 1 wherein, in response to the postmark client receiving from the postmark server an indication that does not authorize the postmark client to add the graphical postmark to the first print stream, the postmark client causes the specified document to be printed from the first print stream.

10. The apparatus of claim 1 wherein the presence of the graphical postmark on a printed document indicates the printed document corresponds to a document in the at least one document management system, thereby indicating the printed document can be destroyed after use.

11. The apparatus of claim 10 wherein the graphical postmark includes a visual indicator that the printed document exactly matches the corresponding document in the at least one document management system.

12. A method for managing printed documents comprising:
   providing a postmark client executing on a client computing device;
   providing a postmark server that communicates with the postmark client and communicates with at least one document management system;
   the postmark client detecting a print event that produces a printed document for a specified document on the client computing device, and in response, queries the postmark server to determine whether the printed document for the specified document should include a graphical postmark;
   the postmark server, in response to receiving the query from the postmark client, queries the at least one document management system to determine whether the specified document matches a document in the at least one document management system; and
   when the specified document matches a document in the at least one document management system, the postmark server authorizes the postmark client to add the graphical postmark to the printed document, and in response, the postmark client receives a first print stream that does not includes the graphical postmark and adds the graphical postmark to the first print stream to generate a second print stream that includes the graphical postmark, wherein the printed document is printed from the second print stream that includes the graphical postmark.

13. The method of claim 12 further comprising:
   when the specified document does not match a document in the at least one document management system, the postmark server does not authorize the postmark client to add the graphical postmark to the first print stream.

14. The method of claim 12 wherein the at least one document management system comprises at least one cloud-based document management system.

15. The method of claim 12 further comprising:
   providing a postmark registry that includes a plurality of entries that each corresponds to one of the at least one document management systems and that each includes corresponding access information for the one document management system.

16. The method of claim 12 further comprising:
providing a printed document store that comprises:
- a first plurality of printed documents that each corresponds to one of the plurality of documents stored in the at least one document management system;
- a second plurality of printed documents that each do not correspond to any document stored in the at least one document management system; and
- for each of the first and second plurality of printed documents, corresponding print metadata that uniquely describes a print event.

17. The method of claim 16 further comprising:
the postmark client generating a print pack comprising print metadata corresponding to the print event and an image for the specified document; and
the postmark client sending the print pack to the postmark server.

18. The method of claim 17 further comprising:
the postmark server, upon receipt of the print pack from the postmark client, processing the print pack and storing the print metadata and the image for the specified document in an entry in the printed document store.

19. The method of claim 16 further comprising:
determining when to retain and purge documents in the printed document store.

20. The method of claim 12 further comprising:
in response to the postmark client receiving from the postmark server an indication that does not authorize the postmark client to add the graphical postmark to the first print stream, the postmark client causing the specified document to be printed from the first print stream.

21. The method of claim 12 further comprising:
the presence of the graphical postmark on a printed document indicating the printed document corresponds to a document in the at least one document management system, thereby indicating the printed document can be destroyed after use.

22. The method of claim 21 wherein the graphical postmark includes a visual indicator that the printed document exactly matches the corresponding document in the at least one document management system.

23. A networked computer system comprising:
(A) a cloud-based computer system comprising:
- a cloud-based document management system that manages a plurality of documents stored in a cloud-based repository;

(B) a client computer system comprising:
- a first processor;
- a first memory;
- a postmark agent residing in the first memory and executed by the first processor, wherein the postmark agent detects a print event that produces a printed document for a specified document by a first software application executing on the client computer system;

(C) a server computer system comprising:
- a second processor;
- a second memory; and
- a postmark server residing in the second memory and executed by the second processor;

wherein the postmark client, in response to detecting the print event for the specified document on the client computer system, queries the postmark server to determine whether to generate a graphical postmark for the print event for the specified document;

the postmark server, in response to receiving the query from the postmark client, queries the cloud-based document management system to determine whether the specified document matches a document in the cloud-based repository; and when the specified document matches a document in the cloud-based document management system, the postmark server authorizes the postmark client to add the graphical postmark to a print stream that produces the printed document, and in response, the postmark client receives a first print stream that does not includes the graphical postmark and adds the graphical postmark to the first print stream to generate a second print stream that includes the graphical postmark, wherein the printed document is printed from the second print stream that includes the graphical postmark.

* * * * *